United States Patent
Discenzo

(10) Patent No.: US 8,615,374 B1
(45) Date of Patent: Dec. 24, 2013

(54) MODULAR, CONFIGURABLE, INTELLIGENT SENSOR SYSTEM

(75) Inventor: Frederick M. Discenzo, Brecksville, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 2329 days.

(21) Appl. No.: 11/423,167

(22) Filed: Jun. 9, 2006

(51) Int. Cl.
*G06F 15/00* (2006.01)

(52) U.S. Cl.
USPC .................... 702/127; 219/497; 340/521

(58) Field of Classification Search
USPC .......... 340/521; 219/497; 702/127, 104, 187, 702/189, 22, 81
See application file for complete search history.

(56) References Cited

U.S. PATENT DOCUMENTS

| | | | |
|---|---|---|---|
| 4,783,748 A | 11/1988 | Swarztrauber et al. | |
| 5,005,142 A | 4/1991 | Lipchek et al. | |
| 5,335,186 A | 8/1994 | Tarrant | |
| 5,959,529 A | 9/1999 | Kail, IV | |
| 6,002,996 A | 12/1999 | Burks et al. | |
| 6,720,887 B1 * | 4/2004 | Zunti | 340/870.28 |
| 6,989,589 B2 | 1/2006 | Hammadou et al. | |
| 7,477,997 B2 * | 1/2009 | Kaplit | 702/55 |
| 2005/0033540 A1 | 2/2005 | Bathurst et al. | |
| 2005/0137464 A1 | 6/2005 | Bomba | |
| 2005/0228609 A1 * | 10/2005 | Moscaritolo et al. | 702/127 |
| 2006/0066318 A1 | 3/2006 | Andarawis et al. | |
| 2006/0119476 A1 | 6/2006 | Hope | |

* cited by examiner

*Primary Examiner* — Brian Jennison
(74) *Attorney, Agent, or Firm* — Turocy & Watson, LLP; R. Scott Speroff; John M. Miller

(57) ABSTRACT

The claimed subject matter provides a system and/or method that facilitates providing real-time in situ measurements in an environment. A sensor module can employ real-time in situ measurements associated with a parameter within the environment. A sensor operation module communicatively coupled to the sensor module via an interface can analyze the real-time in situ measurements, wherein at least one of the sensor module and the sensor operation module allows expansion for at least one module.

32 Claims, 26 Drawing Sheets

MODULAR, CONFIGURABLE, INTELLIGENT SENSOR SYSTEM

CROSS REFERENCE TO RELATED APPLICATION(S)

This application relates to U.S. Pat. No. 6,434,512, filed Aug. 13, 2002, entitled "MODULAR DATA COLLECTION AND ANALYSIS SYSTEM," and U.S. Pat. No. 6,295,510, filed Sep. 25, 2001, entitled "MODULAR MACHINERY DATA COLLECTION AND ANALYSIS SYSTEM. The entireties of which applications are incorporated herein by reference.

TECHNICAL FIELD

The subject innovation relates to measurement, analysis, and control of multiple parameters utilized in conjunction with sensors. More particularly, the invention relates to a system and/or methodology that provides an intelligent sensor that can provide real-time in situ measurements that is at least one of modular-based, configurable to a specific environment, application, or purpose, reconfigurable based upon needs and circumstances, and expandable.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, wirelessly communicate with databases, immediately exchange wireless text messages, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation successfully and in a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a food process and/or food quality.

The greater degree of automation and the drive toward increased throughput and productivity can now produce goods at a rate of hundreds to thousands of items each minute. This extremely high throughput and "hands-off" production places a much greater demand for continuous, in situ product and process quality sensors in various areas such as, but not limited to the food industry, biological agent detection, incubation, anti-terrorism, anti-contamination, bio-sensing, pharmaceuticals, bio-fluids, animal food, packaging, beverages, microbial detection, by-product, waste material, batch processes, up-stream food chemical/additive manufacturing, grower/picker (e.g., manual and automated), food distributor, food manufacturer and packager, environmental monitoring, air quality monitoring, in vivo monitoring and diagnostics, any suitable environment that can utilize sensor technology, etc.

For example, typical food processing plants employ periodic sample extraction and laboratory analysis to monitor product quality. In-process sensors to monitor quality are lightly used. In spite of sample testing, food recalls due to in-process contamination or process upsets continue. It is clear that the nation's food supply is also vulnerable to malicious acts such as from food process employees, suppliers, or foreign nationals such as terrorists. Protection of the food supply from accidental or malicious alteration will be enhanced with expanded continuous in situ monitoring and analysis of food process, food products, and associated machinery. Similarly, the nation's water supply is considered a critical element in our national infrastructure. Municipal and local water supplies may be affected by bacteria and other contaminants and may also be vulnerable to malicious acts. The unique character of our water supply may make detecting and isolating a source of hazardous materials difficult to rapidly detect and isolate.

Conventional systems and/or methodologies utilized to obtain measurements of parameters which need a substantial amount of time for sufficient measurement, require the medium to be extracted from a machine and/or process, packaged and sent to a laboratory, and thereafter tested in a laboratory environment. Such testing results in significant delay in measurement, and can therefore result in delay application and/or process modification if such actions are required. These delays can contribute to accelerated failure of a process, machine, application, and/or degradation of food quality.

While sample extraction and batch measurements can potentially provide superior accuracy, there are associated problems with this technique. These can include: cost (staff, supplies), test equipment acquisition, maintenance, repair, and calibration, training for operator skills and specification equipment, contamination of samples, test availability, worker safety to extract sample, sample disposal, product scrap produced during sample extraction and testing, and the inability to correlate measurement results with dynamic process control or with multiple sensors distributed in the process related to the specific environment the sensor(s) are deployed. Particular processes and/or machinery requiring maintenance based on sensors can be located at positions within a factory and/or plant that are difficult to reach and therefore require a significant amount of the maintenance engineer's time to perform such maintenance. Furthermore, the maintenance engineer is prone to human error (e.g., add incorrect fluids and/or fluid additives to a particular machine or machine component, sample vials may be contaminated prior to sampling, as well as provide the machine or machine component with an over-abundance of fluid, lube oil). These and other similar maintenance errors can result in accelerated failure of the machine, process, and the degradation of product quality and the potential release of dangerous substances in the supply. Product recalls are not uncommon. Many of these recalls are due to contamination, inappropriate process input materials, or process upsets. Serious illness and death has also occurred associated with the above deficiencies.

Intelligent sensors comprised of several or more sensing elements and embedded processors are becoming more prevalent. There are emerging smart sensor standards that can promote the development and deployment of intelligent and/or wireless sensor systems. Conventionally, defining and configuring intelligent sensor systems is primarily done at design time with operating parameters specified during manufacturing and/or device configuration. Typical sensor systems are not practical to develop, manufacture, stock, and support a plurality of designs to accommodate the wide and varying application requirements and sensing needs. As a result, sensors are typically "dumb" sensors or provided as integrated systems coupled to a sensor processor module. Alternatively, smart sensor systems are costly and pre-packaged for specific types of applications.

However, it can be extremely costly and difficult to tailor a sensor system to different applications and/or environments. In particular, a food processing environment requires an environment-specific sensor or sensor system tailored to provide real-time data related to a particular parameter. On the contrary, a pharmaceutical environment requires a different sensor or sensor system that is specifically tailored to the environment to provide real-time data related to a parameter associated therewith. There are specific skills required to design and deploy sensor systems in general. These skills may include analog and digital electronics, software, communications, signal processing, data acquisition, software integration, database, packaging, and materials knowledge. Furthermore, deploying a sensor or sensor system in different environments or applications often includes additional application specific knowledge such as safety standards, compliance requirements, and process knowledge. In other words, there are various environments in which real-time data sensors can be employed, yet each environment mandates tailored sensor systems for different applications (e.g., communications mode, memory capacity, power supply, etc.).

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation relates to systems, architectures and/or methods that facilitate employing a modular-based sensor to provide real-time in situ measurements. An architecture can include a sensor operation module that can be communicatively coupled to a sensor module via an interface to provide a modular and configurable sensor that can implement real-time in situ measurements related to a particular environment. The sensor module can include a sensor component that can monitor and/or detect a particular parameter within the environment. Furthermore, the sensor operation module can read and/or analyze data collected by the sensor component within the sensor module. In particular, the sensor operation modular can be extensible and configurable (e.g., hardware and/or software) to permit readily specifying, constructing, programming, and deploying a reconfigurable intelligent sensor system.

By implementing a modular architecture, the sensor module and the sensor operation module can be expanded to include additional modules that can be added, configured, removed, and/or re-configured. For instance, the additional modules can be, but are not limited to, additional sensing modules with redundant or different sensing characteristics, a display module, a reservoir control module, a power module, a memory module, a communication module, a processor module, an additive/oil reservoir control module, an additive/oil fluid reservoir module, an electronics amplifier and digital processor module, a multi-element sensor module, a lab-on-chip module, an intelligent module, a configure module, a direct communication module, and a self-heal module, a backplane module, an actuator module, a sensor sub-system module (e.g., NIR module), a chemical reagent (e.g., enzyme or catalyst) module, a membrane module, a pump module (e.g., micro-fluidic module), a locomotion module, a data storage module, a trending module, an incubator module, a calibration module and a self-calibration module including associated logic and calibrated materials, a heating module, a cooling module, an energy storage module (e.g., batteries), and a power generation module.

Based on the modular design of the sensor architecture, the modules can be specifically tailored to monitor and/or sense any suitable parameter within any suitable environment in any suitable manner that meets sensing needs. In other words, the sensor module can house a specific sensor device for the particular environment and/or parameters that are to be measured, while the sensor operation module can house a respective sensor operation component that can analyze the collected data from the specific sensor device. Thus, multiple sensor designs need not be developed, manufactured, stocked, and/or supported to accommodate the widely varying application requirements and sensing needs.

In another aspect in accordance with the subject innovation, the sensor module can include any suitable sensor component and/or device. In particular, sensor module can include at least one sensing element, wherein the sensing element can measure one or more particular parameters. The sensor can be fabricated with a suite of micro-electronic and MEMs sensor elements, wherein the sensor elements can continuously detect at least one of the following in real-time: a starch; a moisture; a density; a bio-agent; an oxidation; a temperature; a viscosity; an acidity; a dielectric; polar material; an amount of dissolved water; a capacitance; a pH; an additive; a metal ion; general ionic species, a sugar; a salt; an enzyme; a biological agent; a toxic agent; a radioactive agent; an explosive agent; an airborne element; a gas; a pressure; a solid form material (e.g., a powder, an airborne component); and an electro-chemical characteristic. In addition to detecting the presence of the element of interest, the sensor module may quantify the amount or quantity of the element present. Moreover, this can include sensor fusion, electrical, electro-chemical, or MEMs fluid probing, data analysis, model-based analysis, sensor system quality assessment, sensor data quality assessment, and closed-loop control. In other aspects of the claimed subject matter, methods are provided that facilitates employing a modular-based sensor to provide real-time in situ measurements. Additional capabilities for extending the life of the process or the machinery can also be provided with the sensor module. These capabilities include dynamic fluid alteration such as electrically and/or chemically.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
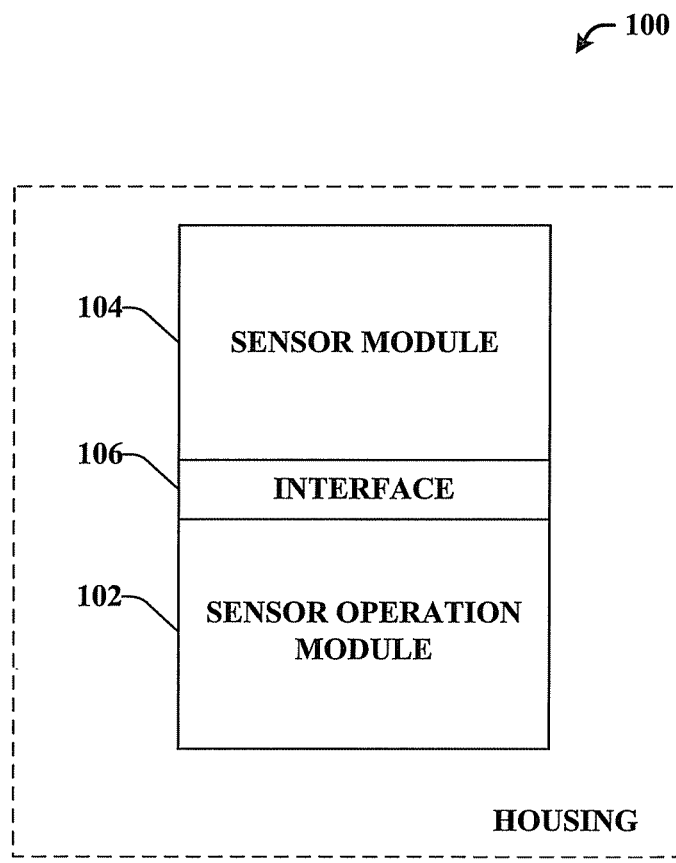
FIG. 1 illustrates a block diagram of an exemplary architecture that facilitates employing a modular-based sensor to provide real-time in situ measurements.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates an architecture 100 that facilitates employing a modular-based sensor to provide real-time in situ measurements. The architecture 100 can include a sensor operation module 102 that can be communicatively coupled to a sensor module 104 via an interface 106 to provide a modular and configurable sensor that can implement real-time in situ measurements related to a particular environment. The sensor module 104 can include a sensor component (not shown) that allows a particular parameter within the environment to be monitored and/or detected. Furthermore, the sensor operation module 102 can read and/or analyze data collected by the sensor component within the sensor module 104. In particular, the sensor operation modular 102 can be extensible and configurable (e.g., hardware and/or software) to permit readily specifying, constructing, programming, and deploying a reconfigurable intelligent sensor system. It is to be appreciated that the sensor operation module 102 can provide a plurality of analysis based at least in part upon the received real-time data related to a parameter associated with the environment. In one example, the sensor operation module 102 can effectuate the environment based at least in part upon the real-time data collected by the sensor module 104. In other words, the sensor operation module 102 can provide at least one of the following: data manipulation, updates, feedback, closed-loop control, state assessment (e.g., failure imminent), trending, forecasting, economic analysis, and/or any other suitable data configuration based on the sensor module 104 and real-time detections. For example, the sensor operation module 102 can manipulate any process and/or application associated with the environment, wherein the manipulation can be based at least in part upon the real-time in situ measurement of data collected by the sensor module 104. The manipulation may be directed by one or more objectives such as required process parameter limits, failure prevention, machinery life extension, lowest life cycle cost, minimum operating cost, or maximum revenue generation for example. Furthermore, the sensor operation module 102 may subsequently change how it operates the sensor component (not shown) in sensor module 104 based as least in part upon previously received sensor information or information received from other sensor modules or the environment. Within the sensor architecture, an adaptive sensing and analysis capability for a specific environment can be included. For example, the presence of a particular contaminant may be suspected based on an initial electro-chemical sensor response. The waveform provided to the electro-chemical sensor may be subsequently altered to specifically check for the presence of the contaminant and to quantify the amount present in the fluid. Alternatively, a higher frequency sampling technique or unique band-pass filter may be applied for dielectric analysis.

Based on the modular design of the architecture 100, the sensor module 104 and the sensor operation module 102 can be specifically tailored to monitor and/or sense any suitable parameter within any suitable environment. In one example, PC communications software can be part of the system for design, configuration, setup, downloading, calibration, re-configuration, troubleshooting, analysis, etc. In other words, the sensor module 104 can house a specific sensor device for the particular environment and/or parameters that are to be measured, while the sensor operation module can house a respective sensor operation component (not shown) that can analyze the collected data from the specific sensor device. By allowing the sensor module 104 and the sensor operation module 102 to be modular and fitted for any environment and/or application, the effectiveness for real-time in situ sensing and/or monitoring is greatly increased. Thus, multiple sensor designs need not be developed, manufactured, stocked, and/or supported to accommodate the widely varying application requirements and sensing needs.

Moreover, the sensor module 104 and the sensor operation module 102 can be expanded to include additional modules and/or components to allow personalization to a particular environment to allow a specific parameter to be monitored and/or sensed. Multiple modules may also be added for redundancy to provide increased reliability and accuracy. Although the modules included within the architecture 100 are the sensor module 104 and the sensor operation module, it is to be appreciated that the architecture 100 can include a plurality of disparate and/or additional modules to provide additional functionality. For example, the architecture 100 can include expansion modules such as, but not limited to, a display module, a reservoir control module, a power module, a memory module, a communication module, a processor module, etc. The architecture 100 can conform to an architecture that permits integrating multiple modules for expanded performance, long duty cycle requirements, or redundancy (e.g., highly reliable applications, ultra-reliable applications, and the like).

Figure 2:
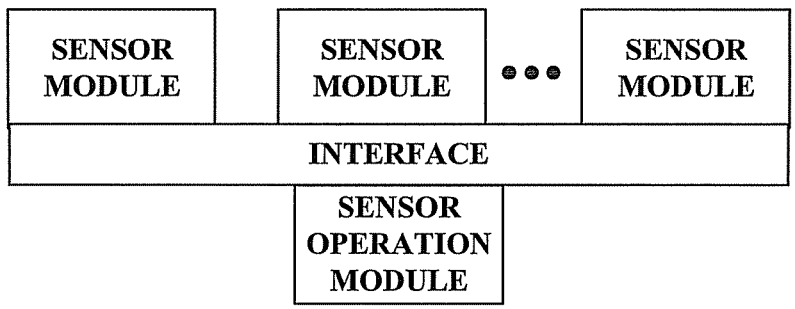
FIG. 2 illustrates block diagrams of exemplary architectures that can employ a modular-based sensor.
Figure 2:
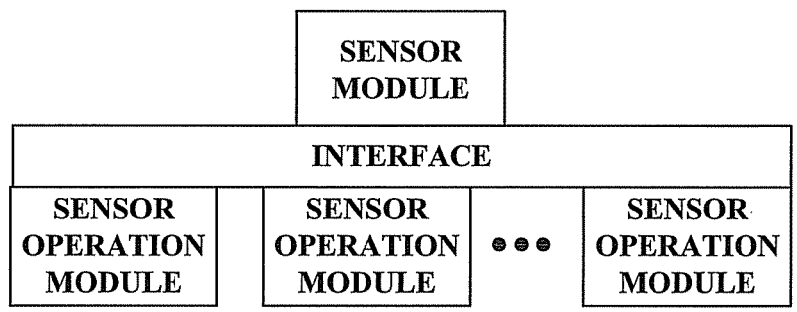
Figure 2:
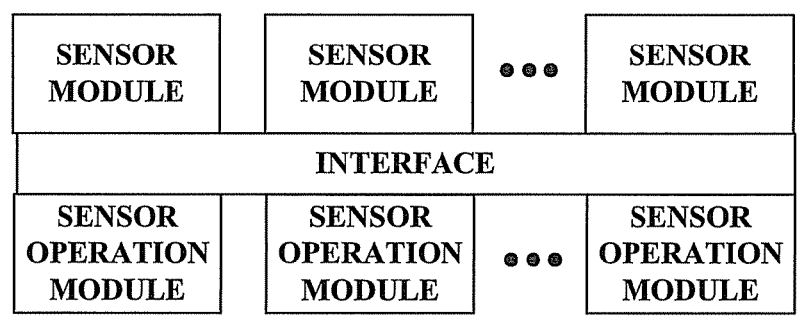

Turning to FIG. 2 briefly for an example, the architecture 100 can be expanded to include multiple sensor modules and/or sensor operation modules. At 202, the architecture can be expanded to include multiple sensor modules for processing by a single sensor operation module. Alternatively, multiple sensor operation modules may be used to process information or fluid provided by one sensor module as shown at 204. Yet another configuration may consist of multiple sensor modules and multiple sensor operations modules as shown at 206. The sensor operation modules may perform specific and complementary processing or may be invoked as needed to meet response time, accuracy, or reliability requirements. By implementing expansion modules, the architecture 100 can be extremely versatile in adapting to environments to provide real-time in situ measurements for parameters by utilizing the appropriate modules. It is to be appreciated that a simple architecture can be implemented such as a sensor module with a communications module to merely transmit raw sensed signal data. For instance, the communications module can be implemented utilizing a wireline or wireless communications.

Referring back to FIG. 1, expansion of the architecture 100 can be implemented by communicatively coupling an additional module to the sensor module 104, the sensor operation module 102, and/or any combination thereof. In other words, the architecture associated with the architecture 100 includes minimum, core functional modules that allow the real-time in situ detection of at least one parameter within an environment. However, based on the modular-based assembly, the sensor module 104 and the sensor operation module 102 can be modified specifically to an application, an environment, a process, a parameter, etc. For instance, a multi-element sensor device can be included with the sensor module 104 that can sense at least one of the following: pH, dielectric, pressure, temperature, electro-chemical sensor elements, starch, moisture, density, oxidation, viscosity, acidity, polar materials, water (dissolved), capacitance, additive depletion, ions, sugar, salt, enzymes, gases, starch, oxidation level, dissolved oxygen, viscosity of materials, density of materials, contaminants, additives, and/or the acidity of effluents, metal ions, dissolved water, additives, oxidation level, acidity, biological fluids, biological species, biochemical oxygen demand (BOD), chemical oxygen demand (COD), a solid form material (e.g., a powder, an airborne component), and degradation compounds. Thus, the sensor module 104 can include a particular sensing element for a particular parameter to be measured, while the sensor operation module 102 can provide respective analysis accordingly.

It is to be appreciated that the sensor module 104 and the sensor operation module 102 can provide real-time measurements for a plurality of parameters within any suitable environment. The architecture 100 can provide a real-time in situ measurement related to one or more particular parameters, wherein the parameter can be associated with a process and/or relate to the process, equipment, environment and/or product. The term product includes the output from the process whether consumable or not. Product may include human consumable goods such as foods or pharmaceuticals, usable by-products (e.g., odorants), animal feed, recyclable wastes, digestible waste, and unusable output (e.g., material for disposal or burning), chemicals, coatings, machinery, material movement or material handling, material alteration, or conversion. For example, the architecture 100 can provide real-time data associated with a food process environment. The food process environment can be any suitable food process, factory, application, plant, etc. that produces, prepares, cooks, alters, or packages a food product. Moreover, the food process environment can be any industrial automation environment that produces a food product and/or a portion of a food product. For example, the food process environment can include and/or be associated with, but is not limited to, an incoming raw material (e.g., carrots, beans, potatoes, corn, lettuce, peanuts, salt, grapes, oranges, nuts, sugar, milk, flavorings, food extracts etc.), cooking oil, wash water, cooking water, a storage tank, bioprocess such as a microbial digestion system, a fermenting process such as beer making, beverage making including formulation, blending, and gas control, cooking, a food package, a food packaging line, a food ingredient dispenser, food distribution, food storage, food transport, a waste stream, etc. Similarly, the process environment may be a life sciences process such as found in pharmaceutical manufacturing. The processes may include fermentation, bio-reactions, blending, sorting, chemical reactions, drying, squeezing, coating, weighing, and packaging. Furthermore, the architecture 100 can provide real-time process or in situ measurement of food mixing parameters and food blending parameters related to the food process environment. Alternatively, the architecture 100 can provide real-time process or in situ measurement, characterization, validation, and recording of critical process parameters (CPPs) critical to the pharmaceutical process.

In addition, the architecture 100 can include any suitable and/or necessary interface component 106 (herein referred to as "interface 106"), which provides various adapters, connectors, channels, communication paths, etc. to integrate the sensor operation module 102 and the sensor module 104 into virtually any operating and/or database system(s) and/or with one another. The interface 106 can receive data, wherein the data received can relate to a parameter, an environment, a real-time measurement, etc. Such receipt of the data via the interface 106 allows the sensor module 104 to communicate real-time data to the sensor operation module 102 for analysis. In addition, the interface component 106 can provide various adapters, connectors, channels, communication paths, etc., that provide for interaction with the at least one of the sensor operation module 102, the sensor module 104, an expansion module (not shown), a parameter within an environment, and/or the environment. The sensor interface module may be generalized to provide for bi-direction communications between the sensor operation module and the sensor module. For example, a bias or stimulus signal may be sent to the sensor module via the interface 106. This bias or stimulus can affect the way the sensor module 104 senses the particular parameters and how it sends the information back to the sensor operation module 102.

Figure 3:
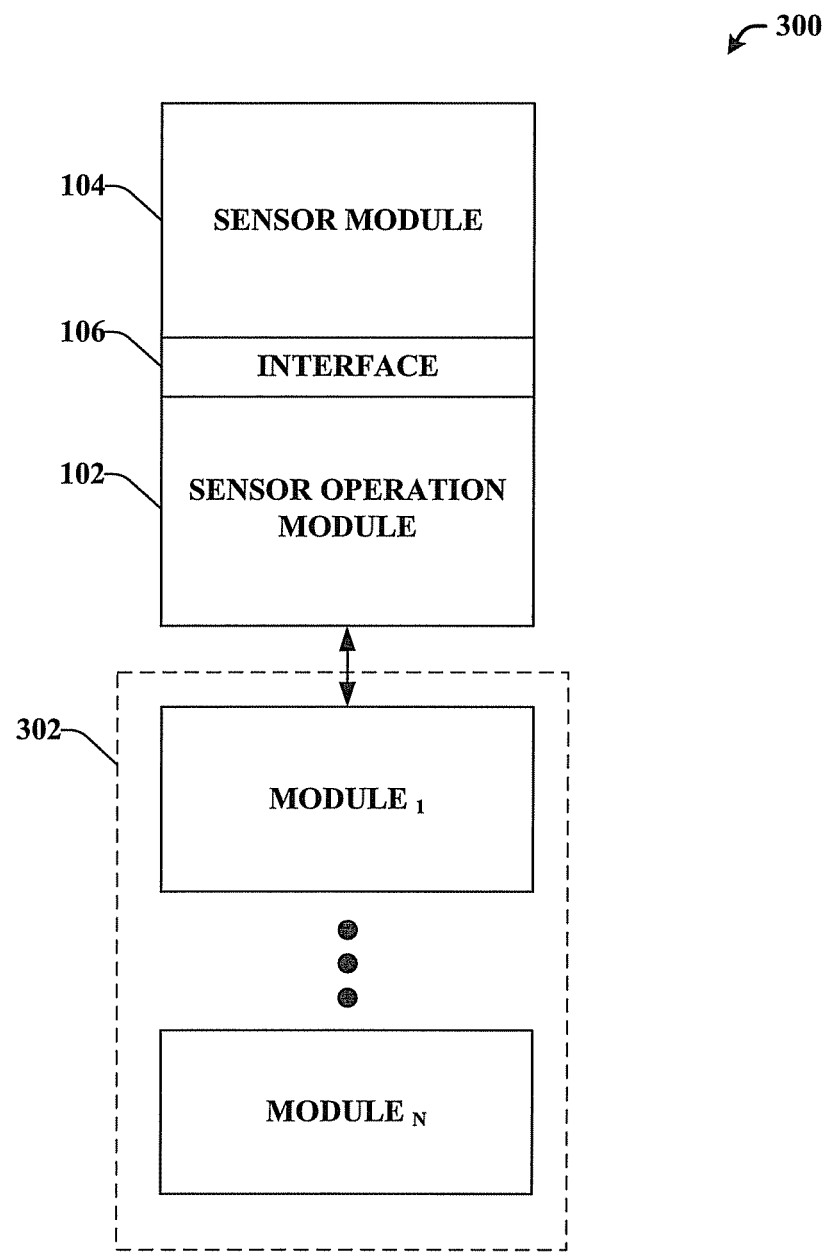
FIG. 3 illustrates a block diagram of an exemplary architecture that facilitates utilizing an expandable modular-based sensor that can be specifically tailored for a particular environment to provide real-time data.

FIG. 3 illustrates an architecture 300 that facilitates utilizing an expandable modular-based sensor that can be specifically tailored for a particular environment to provide real-time data. The architecture 300 can include the sensor module 104 communicatively coupled to the sensor operation module 102 via the interface, wherein such architecture 300 can provide real-time in situ measurements, monitoring, detection, and the like to a particular parameter within an environment such that the architecture can be specifically tailored to the particular parameter and/or the environment utilizing various modules. In one example, PC communications software can be part of the system for design, configuration, setup, downloading, calibration, re-configuration, troubleshooting, analysis, etc. In other words, the architecture 300 allows real-time in situ sensing, measuring, detecting, and/or monitoring of data based on at least one of application needs, parameter characteristics, and/or environment conditions by employing a modular-based architecture with various interchangeable, replaceable, configurable modules. In particular, the sensor module 104 can provide a sensor device that provides real-time data collected, while the sensor operation module 102 can provide analysis related to the collected data. It is to be appreciated that the sensor module 104 and/or the sensor operation module 102 can be interchangeable, replaceable, and/or configurable to a particular environment and/or a specific parameter. For instance, a sensor device can be included within the sensor module 104 to collect real-time data associated with oil, while the sensor operation module 102 can include sensor operation components to analyze such collected data.

The architecture 300 can include expansion modules 302 that allow the architecture 300 to increase functionality related thereto, wherein such added functionality can be correlated to the particular module added to at least one of the sensor operation module 102 and the sensor module 104. Although the expansion modules 302 are depicted to be communicatively coupled to the sensor operation module 102, it is to be appreciated that the architecture 300 allows any expansion module to be communicatively coupled to the sensor module 104, the sensor operation module 102, and/or an already-added expansion module. Moreover, there can be any number of expansion modules 302 from module 1 to module N, where N is an integer greater than or equal to one. For example, the expansion modules 302 can be self-packaged units categorized by the functionality that can be integrated to the architecture 300. In particular, the modules can relate to, but not limited to, processing, power supply, storage of data, packaging of data, communication, reservoir control, etc. For example, one of the expansion modules may be comprised of a sensor module that determines temperature and a sensor operation module that interprets or filters the sensor module's sensed parameter and provides an average temperature value in degrees centigrade. Yet another coupled expansion module may be comprised of an electrical sensor element that performs a dielectric analysis on a fluid. The interpretation of the sensor response to the AC signal may be interpreted by the sensor operation module to provide a measure of the conductivity of the fluid at different frequencies.

In accordance with one aspect of the subject innovation, the sensor module 104, the sensor operation module 102, and at least one of the expansion modules 302 can provide a suitable identification code that facilitates communication with any module associated with the architecture 300. For example, each module can utilize a module identification code (e.g., Internet Protocol (IP) address, radio frequency identification (RFID) code, an embedded code, a keyed code) that permits automatic software configuration assessment, logical integration of each module's functionality, automatic configuration, etc. In one particular instance, the various modules combined to provide real-time in situ measurements for a parameter within an environment can communicate to each other to allow proper functionality and cohesiveness. Therefore, each module can be aware of disparate module's and respective functionality in order to accurately and efficiently collect data for the particular environment and/or parameters for which the modules were combined and/or selected. The objective of the suite of sensor modules may change dynamically based on changes in the machinery mission, workload, priorities, degradation state of machinery, material input characteristics, or the environment. Moreover, the modules can be self-diagnosing and self-calibrating and automatically re-configurable based on a sensed condition.

In accordance with another aspect of the subject innovation, at least two of a module and a sensor system can exchange information for more accurate independent analysis and collaborative decision making. Moreover, such multiple modules in a sensor system can operate utilizing an intelligent agent framework. Multiple sensor systems can also operate in a collaborative mode utilizing an autonomous agent framework, distributed computing or collaborative framework. For example, a sensor system monitoring engine oil may detect the slight presence of fuel. This information can be relayed to the fuel monitoring sensor system to check pressure, fuel level, flow rates, and oil contaminants present. The collaborative results of these two sensor systems can more accurately establish that there is a leak from the fuel system to the oil system.

Figure 4:
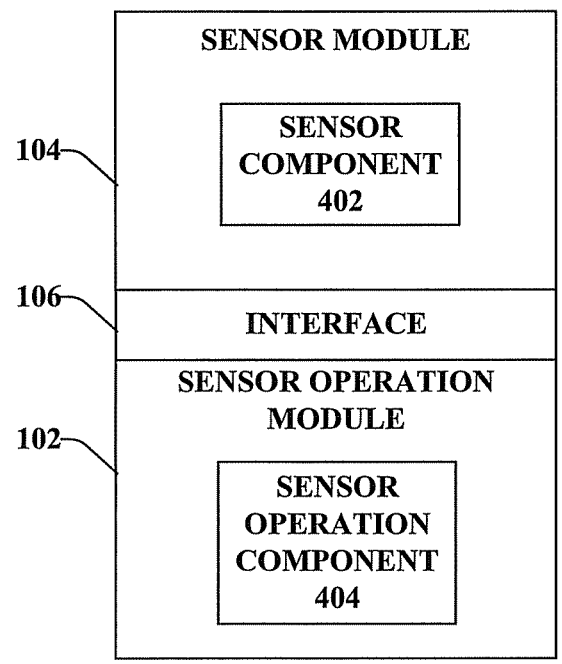
FIG. 4 illustrates a block diagram of an exemplary architecture that facilitates providing an intelligent sensor system that can be configurable to a plurality of environments to provide real-time measurements for at least one parameter.

FIG. 4 illustrates an architecture 400 that facilitates providing an intelligent sensor system that can be configurable to a plurality of environments to provide real-time measurements for at least one parameter. The architecture 400 can include the sensor module 104 that can be communicatively coupled to the sensor operation module 102 via the interface 106. The sensor module 104 can include a sensor component 402 that can collect data associated with a parameter related to an environment in real-time. The sensor component 402 can be any suitable sensing device that can provide data collection, monitoring, and/or measuring. The sensor component 402 may include a capability for stimulating the sensor element and/or the environment. For example, the sensor component 402 could include an electro-chemical sensor element that is stimulated with a sinusoidal voltage or triangular waveform signal. The resultant signal response from the electro-chemical sensor element will be the reduction-oxidation response of the material or fluid in the vicinity of the sensor elements. Similarly, the sensor component 402 could be a MEMs actuator whose response is dependent on the fluid density or viscosity. By actuating the MEMs structure and recording the time response an estimate of fluid viscosity may be determined. In another instance, based on the modular design of the architecture 400, the sensor module comprised of 104 and 402 can house a sensor to provide measurements for a fluid, a gas, a solid, and/or any combination thereof. Moreover, the sensor component 402 can be a multi-element sensor (discussed infra) that can collect data related to a plurality of parameters. It is to be appreciated that the modular architecture associated with the sensor module 104 allows any suitable sensor device to be utilized, wherein such sensor device can be specifically tailored to a parameter to measure and/or a particular environment. In one example, PC communications software can be part of the system for design, configuration, setup, downloading, calibration, re-configuration, troubleshooting, analysis, etc. In addition, the sensor module 104 can include at least one element that can be physically packaged together or separated linked via a communication line and/or a fluid line.

The sensor operation module 102 can include a sensor operation component 404 that can provide a plurality of analysis based at least in part upon the received real-time data related to a parameter associated with the environment. In one example, the sensor operation component 404 can effectuate the environment based at least in part upon the real-time data collected by the sensor component 402. In other words, the sensor operation component 106 can provide at least one of the following: data manipulation, updates, feedback, closed-loop control, state assessment (e.g., failure imminent), trending, forecasting, economic analysis, and/or any other suitable data configuration based on the sensor component 402 and real-time detections. In particular, the sensor operation module 102 can house any suitable sensor operation component 404 that can analyze the collected real-time data from the sensor component 402 housed and/or contained within the sensor module 104. For instance, the sensor operation component 404 can be an electronic disc that records the data, a processor and memory, etc. that can utilize the real-time in situ measurements for manipulating the environment and/or parameter monitored.

Figure 5:
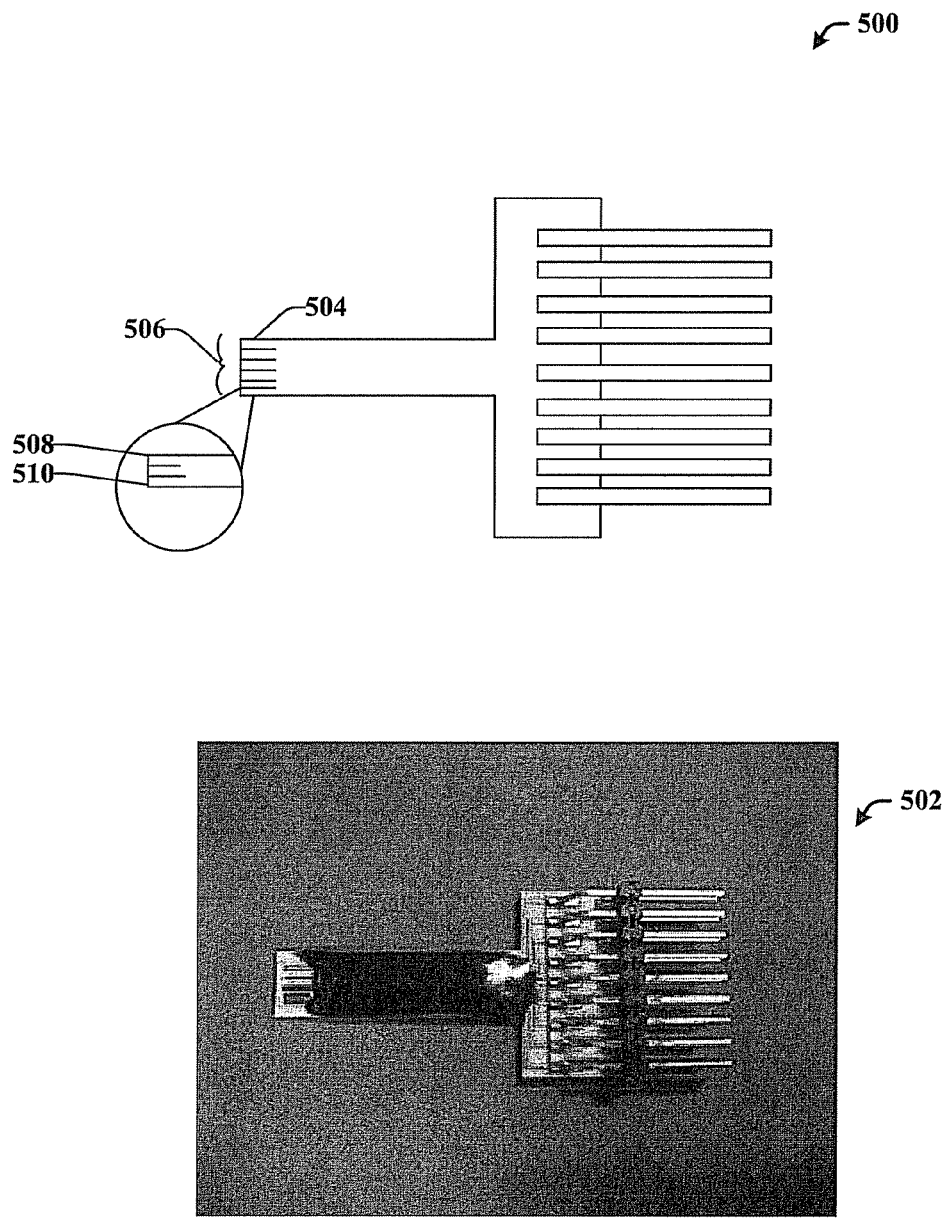
FIG. 5 illustrates a block diagram of an exemplary sensor that facilitates real-time in situ measurement of parameters associated with a food processing environment.

FIG. 5 illustrates a sensor 500 that facilitates real-time in situ measurement of parameters associated with an environment. A multi-element sensor 500 is illustrated that can be housed within the sensor module (not shown), wherein such multi-element sensor 500 can provide continuous, real-time, in situ measurements. The multi-element sensor 500 can include a suite of sensor elements 504. The suite of sensor elements 504 may comprised of one or more individual sensor elements 508. Each sensor element is designed and is operated to measure one or more process or machinery parameters. Each sensor element 508 may be comprised of one or more sensor electrodes 510 and/or MEMs devices. The sensor electrode and MEMs device design, material, and operation is specified to permit operation in the process environment and provide the desired process parameters. A sensor element 508 can be adapted to sense a multitude of critical process parameters. It is to be appreciated that the multi-element sensor 500 can be substantially similar to the sensor described in previous figures. The multi-element sensor 500 can be adapted to sense critical process parameters such as fluidic, particulate, solid, or airborne, and/or characterize the chemistry of materials in real-time. For instance, the multi-element sensor 500 can continuously sense starch in fluids, oxidation in cooking oils, viscosity of fluids, density of materials, contaminants, additives, a solid form material (e.g., a powder, an airborne component), and/or the acidity of effluents. Moreover, the multi-element sensor 500 can be a useful, high-impact small sensor probe to be employed for incoming raw material inspection related to an environment. Raw materials may be continuously inspected to insure they conform to purchase specifications. Raw material variability may also be communicated to downstream processes for use in suitably altering the process control process to insure high quality production and processing in an optimum manner with minimum product variation. Another illustration of the multi-element sensor 502 is also depicted. It is to be appreciated and understood that the multi-element sensor 500 and 502 can include a plurality of sensor elements 506 on a single substrate that can sense and/or detect difference characteristics and/or parameters of a particular medium. For example, when the medium is oil, the following can be sensed; temperature, dielectric, ions (e.g., metal ions), dissolved water, additives, oxidation level, acidity, degradation compounds, and viscosity. The sensor element 506 can be separately, uniquely, and actively stimulated to "probe" the fluid and the sensor element 504 response can be recorded and analyzed. In other words, the multi-element sensor 500 and 502 is an active sensor rather than a passive sensor. Subsequent operation of the active sensor may be altered based on the previously sensed and analyzed data or based on time, or operator request, or other computed, timed, or requested events. The sensor element 504 response can be integrated by utilizing, for instance, sensor fusion. The multi-element sensor may be fabricated as a pluggable sensor device as shown in FIG. 5.

Figure 6:
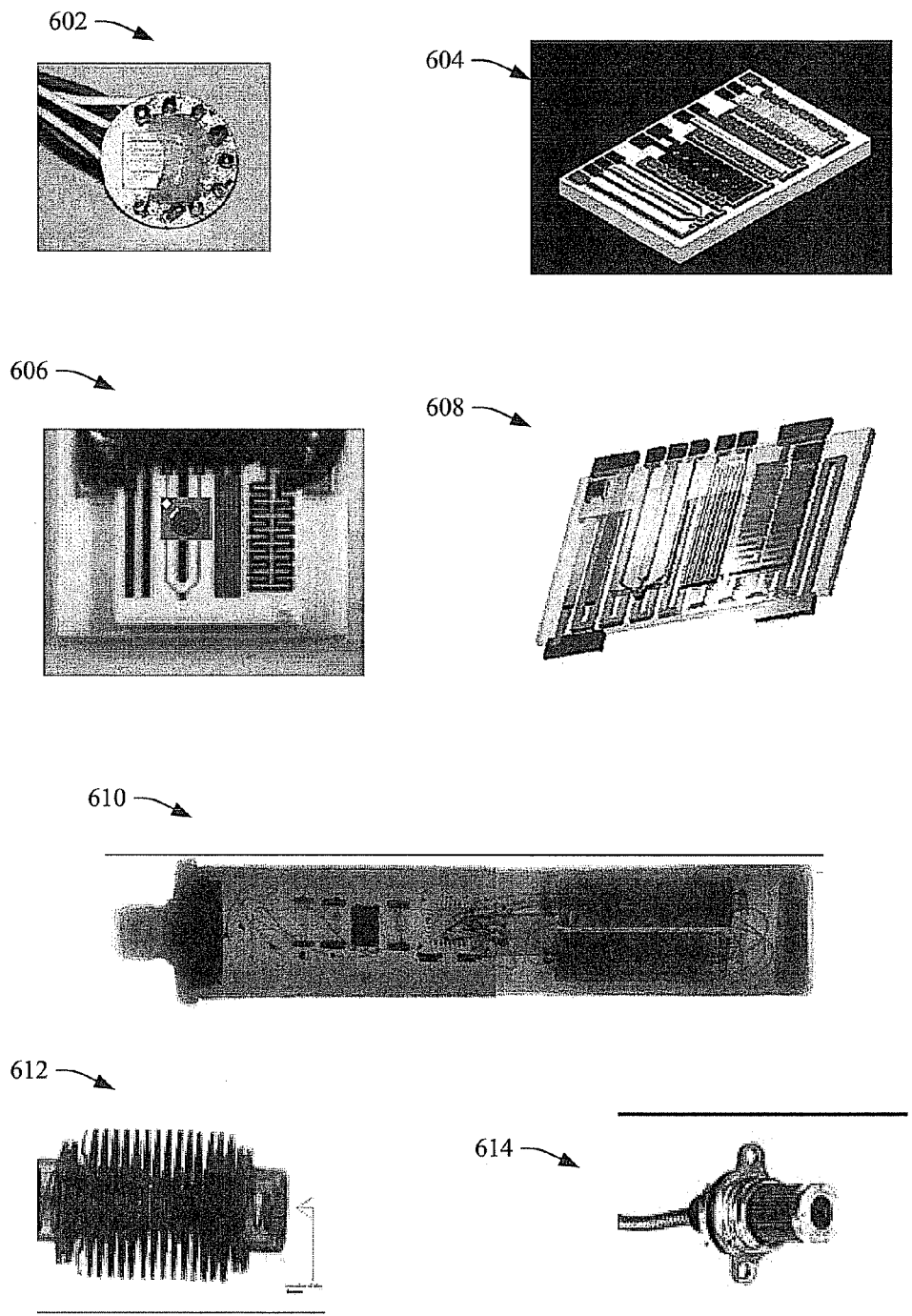
FIG. 6 illustrates various aspects in accordance with the claimed subject matter.

Alternatively, turning briefly to FIG. 6, the sensor device may be fabricated on a circular disc of ceramic with bonded and wired sensor elements as shown at 602. These elements may be directly wired to the sensor interface components. If needed, the sensor device may be fabricated using high temperature materials to permit in situ operation in harsh environments. The multi-element sensor array may also be fabricated with additional sensor elements included such as a pressure sensor as shown at 606, a MEMs viscosity sensor (not shown), and/or at least one heating element in proximity to the sensor elements as shown in 604 and 608 and/or a MEMs cooling element such as employing a MEMs Stirling cooler (not shown). The integral heating element may be interspersed between the sensor elements or as a thermally controlled based under the heating elements as shown at 604 and 608.

Turning back to FIG. 5, the multi-element sensor 500 and 502 can utilize wireless communication to communicate real-time data collected. In addition, it is to be appreciated that the multi-element sensor 500 and 502 can be a self-contained device (e.g., including all electronics and/or equipment necessary to provide real-time data associated with an environment) with wireless communication and locally powered.

An example self-contained, in situ wireless sensor system capable of sensing and analyzing multiple fluid parameters and wirelessly communicating raw data and/or analysis results is shown in FIG. 6 at 610. The sensor module may be packaged as a sensing module similar to commercial sensors available today. Alternatively, the sensor architecture may be packaged in a device currently installed on machinery such as a filter. An example of a sensor embedded in an oil filter is shown in FIG. 6 at 612 and 614 respectively.

Turning back to FIG. 5, sensor power may be provided by wired power connections, embedded stored power (e.g., batteries, capacitors, micro-fuel cells), or self-powered by extracting power from the environment or any combination of one or more of the previous powering methods. For example, power for the sensor may be provided by one or more of converting vibration to power (e.g., using a piezo-electric cantilever beam that vibrates from a vibrating environment), photovoltaic cells, thermal gradient (e.g., thermoelectric devices), fluid flow (e.g., rotating micro generator with a paddle), changing magnetic field and a induction coil, or through movement of a magnet in a coil (e.g., turbulence induced movement), converting process fluid to energy, or other known power generating mechanisms (e.g., movement of a charged capacitor plate) that may be utilized in the environment that it is placed and/or positioned).

For instance, the multi-element sensor 500 and 502 (further referred to collectively as the multi-element sensor 500) can be a single-pronged or multi-pronged probe (e.g., "a smart fork"), wherein each prong 500 can be fabricated with a suite of micro-electronic sensor elements including, but not limited to, pH, dielectric, pressure, temperature, electro-chemical sensor elements, starch, moisture, density, bio-agents, oxidation, viscosity, vibration, acidity, polar materials, water (dissolved), capacitance, additive depletion, metal ions, ions, sugar, salt, enzymes, and gases. For example, while unloading a raw material, at least a portion of the raw material can be sampled and a chemical and physical characterization can be created describing the stream of raw materials. In addition, the multi-element sensor 500 can be an enabler that provides unique opportunities for dynamic process control and/or condition-directed material chemistry modification. It is to be appreciated that the sensor can also signal machinery or sensor fault.

For instance, the multi-element sensor 500 can include one or more micro-probes with each probe containing multiple sensor elements 504 that can be exposed to a raw material (e.g., potatoes, oranges, melons, vegetables, fruits, liquids, pepper, eggs, wheat, butter, salt, sugar, milk, water, flour, spices, seasoning, etc.) interior when the raw material is "pricked" with the "smart fork." It is to be appreciated that the claimed subject matter can include multiple sensors in a batch process, a reactor, and/or a continuous process. In addition, the multiple probes can establish various other parameters associated with the raw material, such as, but not limited to, the electro-chemical potential, starch content, water content, sugar content, acidity, ionic composition, potential age and/or type, contaminants present, dielectric analysis, and chemical composition. Moreover, the above capability is enabled by the ability of the sensor to actively search for specific chemical species or elements with known reduction potential or activation voltages and the integrated sensor software sensor fusion algorithms. Furthermore, by implementing the multi-element sensor 500 into an environment (as described above), the following benefits can be provided: 1) rejection of inferior quality raw material; 2) graduated level of payment for raw materials based on quality; 3) higher level of product quality and/or more consistent quality; 4) downstream control changes made in anticipation of changing feedstock rather than responding to a process upset; 5) utilize energy just to the level necessary based on the characteristics of the process material; 6) increased safety; 7) increased security, 8) optimization of energy costs, 9) optimization of revenue generation, 10) regulatory compliance, 11) model-based analysis and control, 12) support for process analytical technologies (e.g., PAT defined for pharmaceutical manufacturing), 13) reduced cost for waste and waste removal; 14) basis for economic investment and decision support, 15) control optimization for higher speed processing and reduced scrap or waste, 16) safer operation particularly with hazardous substances, 16) faster product release due to continuous in-process knowledge, and 15) waste to energy processing providing (e.g., aerobic/anaerobic digestion, discussed infra) more efficient with greater energy recovery.

The multi-element sensor 500 can be implemented to provide continuous, real-time, in situ measurements in relation to various mediums. In particular, the sensor element 504 can be coated in such a manner that the sensor elements are protected against harsh environments and materials (e.g., machinery wash-down), less susceptible to contamination and fouling (e.g., non-intrusive in vivo sensing), provide broad range sensitivity, provide selective sensing (e.g., hydrophilic coatings), provide component specific sensitivity (e.g., ion-selective coatings), provide bio-selective sensing (e.g., molecular imprinting or enzymatic coatings), or provide for controlled accelerated degradation (e.g., corrosion sensing). The multi-element sensor 500 can be designed to detect various gases, microbial agents, a solid form material (e.g., a powder, an airborne component), etc. In other words, the multi-element sensor 500 can provide detection, classification, quantification, characterization, monitoring, and/or data collection in any one of a liquid, solid, slurry, emulsion, particulate, solid, plasma, vapor, and gas (e.g., ambient air or nitrogen gas) for example. For instance, the multi-element sensor 500 can provide continuous monitoring of a raw product, gasses associated with the raw product, and liquid associated with and/or utilized with the raw product. It is to be appreciated that the multi-element sensor 500 can include sense elements 504 on both sides of the substrate. Moreover, the sensor can be of one or more of any suitable shape such as, but not limited to, rectangular, circular, triangular, cubic, torroidal, elliptical, tubular, conical, etc. Sensor elements may be fabricated using thin-film or thick-film techniques and may be fabricated directly on the component to be integrated into the sensor package.

Figure 7:
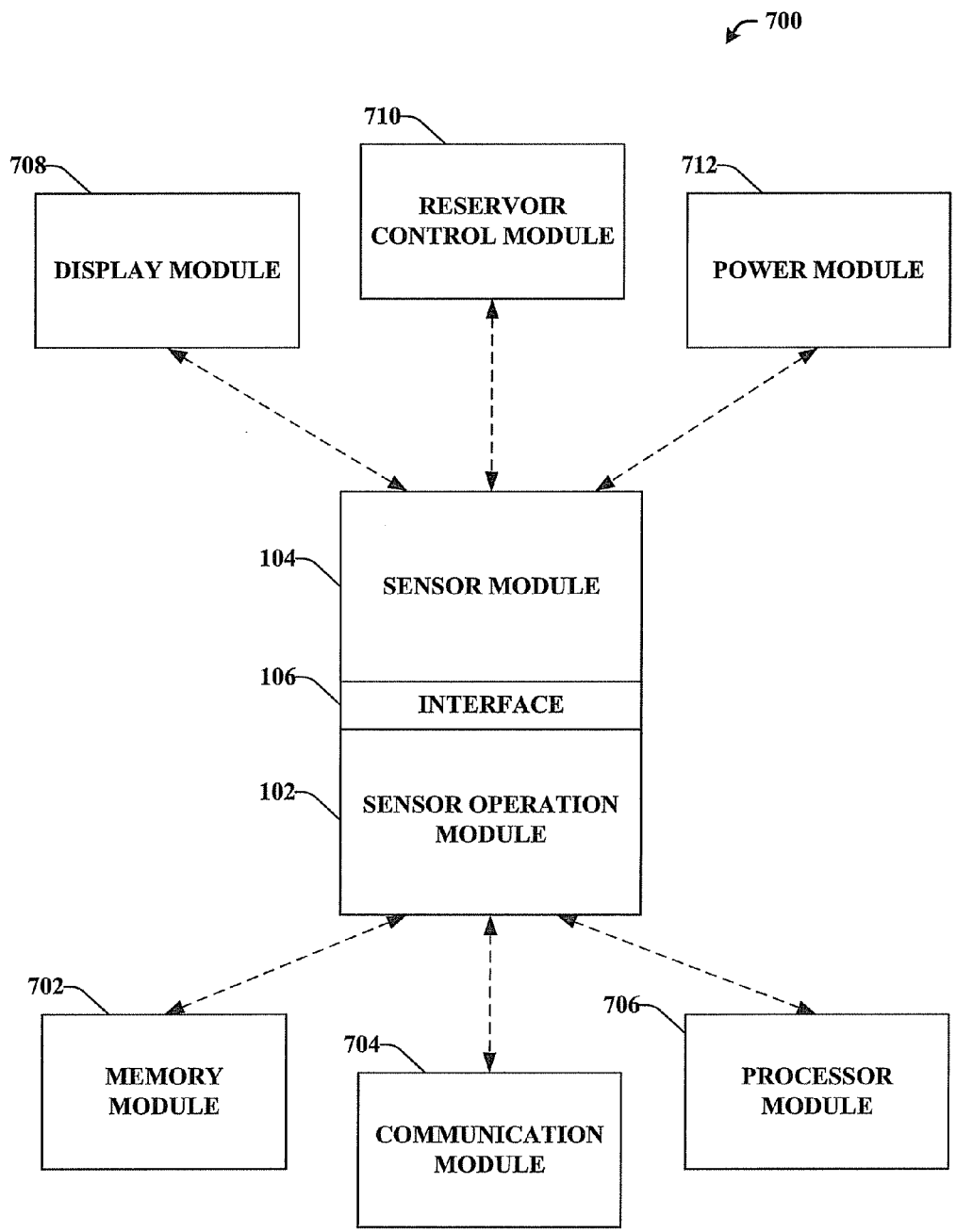
FIG. 7 illustrates a block diagram of an exemplary architecture that facilitates modularly configuring a real-time data sensor to a particular environment.

FIG. 7 illustrates an architecture 700 that facilitates modularly configuring a real-time data sensor to a particular environment. The architecture 700 can be expanded and/or specifically tailored to add various functionalities to provide real-time in situ measurements for a parameter within an environment. In one example, PC communications software can be part of the system for design, configuration, setup, downloading, calibration, re-configuration, troubleshooting, analysis, etc. As depicted, a plurality of function-specific modules can be added to the sensor module 104 and/or the sensor operation module 102 (referred to as the "core modules" based on providing the core functions of collecting real-time data, recording the real-time data, analyzing data, communicating, displaying, and actuating/controlling respectively). In other words, the core modules can be modified, expanded, retracted, and/or configured according to a particular environment and/or sensing needs. It is to be appreciated that any number of modules (specifically the modules described infra having particular functionality) and any suitable number of such function-specific modules can be utilized with the core modules. Together, the suite of modules can provide supporting and complementary functions to carry out a set of application-specific sensing, analyzing and actuation capabilities. As the application-specific needs vary the suite of modules may be adapted, re-configured, or modules added or removed to readily carry out the different and possibly dynamically changing needs. It is to be appreciated that the groups of modules can relate to at least one of the following: sensing; power; actuation; reaction processing (e.g., chemical or bio-reactor), incubating, mixing, filtering, logic and memory (e.g., control, analysis, etc.); mobility, communications; display and packaging.

A memory module 702 can provide memory and/or storage for the core modules to allow for additional and/or suitable data storage for collected data, analysis, configurations, settings, and/or any suitable data related to the architecture 700. The memory module 702 can include any suitable memory and/or storage for data to allow tracking, querying, delayed analysis, backup, transfer, and the like. Thus, if a particular sensing need requires additional storage capacity, an additional memory module 702 can be utilized. Similarly, if a particular sensing need requires less storage capacity, a smaller memory module 702 can be employed. In yet another example, the memory module 702 can function as a black box to be employed with the core modules. When module 702 functions as a "black box" recorder, sensed information is recorded along with other operating information, context data, and time information for subsequent "play back" and analysis.

The core modules can also be expanded by implementing a communication module 704 that can provide data communication. For instance, the data collected by the core modules can be communicated to a disparate system, sensor, host, network, and/or entity. For instance, the communication module 704 can be a wireless device, a radio frequency identification (RFID) component (e.g., RFID reader, RFID writer, RFID reader/writer, etc.), 4-20 MA, Intellibus, Ethernet, DeviceNet, Zigbee, Infrared (IR), wireless Ethernet (e.g., IEEE 802.11b), wide area network interface (e.g., satellite), low-power sensor network (e.g., IEEE 802.15.4), optical, acoustic, and the like. Thus, the core modules can collect and store real-time data, while the communication module 704 (if desired by the particular configuration) can provide communication functionality to transmit such data to a user, a computer, a device, a controller, a portable digital assistant, a network, an Internet Protocol (IP) address, an entity, a machine, etc. The communications module 704 may employ a one-directional or a two-directional communications link. The bi-directional link may permit downloading digitally encoded content including software, operating parameters, data, configuration information, control information, and calibration information. Data transmitted through the communication module 704 may be summary information, raw data, analytical results, control information or any combination of these. Data may be compressed and/or encrypted to support application reliability and security requirements. Based on the application requirements, more than one communications modules 704 may be employed to provide for multiple uses of the sensed data, to provide enhanced reliability through redundancy, to enable parallel and/or collaborative processing, to transmit different raw data, analytical results, or process information, or to receive information, actuation commands, or calibration information. The communications module 704 may be one element in a more complex communications structure such as in an ad hoc network or in a mesh network, processor-to-processor communications, supporting a real-time database on a network server or a satellite or other wireless paging system. The communications module 704 may be used to interface to other computer-based sensing and automation systems and may employ some type of handshaking or authentication procedure for enhanced data transmission accuracy, reliability, or security. The protocol for transmission may utilize a pre-defined ASCII message string or an object-oriented protocol. A messaging format and protocol such as XML may be employed. Communications may be done in a standard format such as specified by OSA-CBM, MIMOSA, or ISO-13374 for example. Finally, the communications messaging may be structured and directed to support autonomous sensing and actuation modules such as used in the context of autonomous agents. Communications support for autonomous agents may be prescribed using various messaging schemes including standard messaging such as defined in the Foundation for Intelligent Physical Agents (e.g., FIPA, www.fipa.org).

In addition, the core modules can utilize a processor module 706 that can provide any suitable processing needs and/or requirements in order to control the sensor element, data acquisition, and processing of the real-time collected data. For instance, the processor module 706 can house a particular processor based on the processing needs for a particular environment and/or sensing need. Moreover, the processor module 706 can provide electronics amplification, digital processing, analog to digital conversion, etc. The processor module may include analog circuitry, digital circuitry, a microprocessor, embedded memory, instructions (e.g., code), firmware, and integrated circuits both analog and/or digital IC's including application specific ICs (e.g., ASICs). In one example, an environment that requires high-speed processing can employ an analog ASIC, analog filtering and a high-performance the processor module 706 (e.g., pipeline architecture) that meets such requirements and/or sensing needs.

The core modules can further be expanded to provide display functionalities utilizing the display module 708. The display module 708 can be a local display such as, but not limited to one or more of, a tri-state LED, a micro-LCD, an on-off LED, a monitor, a dot-matrix display, a color LCD panel, a tower light, an acoustic annunciator, illuminated button, analog gauge, digital image projector, operator goggles (e.g., augmented reality human wearable display), heads-up-display, wireless PDA, cell phone display, pager display, etc. For instance, the display module 708 can be utilized to provide visual data to a user, an observer or monitoring entity, a disparate system, etc., wherein the data can be associated with the architecture 700, a particular module, a collection of modules, and/or any combination thereof. The display module 708 may include an integral input module (not shown). The integral input module may accept keyboard or mouse-directed input from an operator display screen, button, keypad, speech recognition or other acoustic input, touch-sensitive screen, or joystick. Such user input may be used to control subsequent sensing, analysis, display, operation, configuration, or other parameters. Moreover, the core modules can employ a reservoir control module 710 that can provide intelligent control for a reservoir that contains a sample to be measured, monitored, and the like. In addition, the reservoir control module 710 may contain an amount of replacement fluid, a reagent, a catalyst, filter bed, or an additive to be administered to the operating fluid to extend the operating life of the system or reduce damage to the machinery or process. For example, an environment can include a parameter and/or medium that can be measured by taking a sample into a particular reservoir to measure. In addition, the reservoir can provide a particular additive in order to provide real-time in situ measurements in accordance with the parameter to be measured and/or the specific environment. For example, the multi-element sensor may detect the depletion of an anti-oxidant. Based on the fluid condition, operating environment, and expected future operating requirements, a prescribed amount of anti-oxidant required may be computed and administered to the fluid in the machinery. The prescribed amount of additive to be administered may be optimal in some sense such as reliability, operating cost, or longevity of operation. Subsequent fluid sampling can be used to confirm the correct amount of additive was added. Adjustments in fluid addition calculations, fluid modeling, or expected running requirements may be made in a feedback manner by reservoir control module 710 to further insure the continued un-interrupted and efficient operation of the machinery.

A power module 712 can also be utilized in accordance with the subject innovation. The power module 712 may be used to supply power to the other modules requiring energy. The modules that may utilize power from the power module 712 include the memory module 702, the communications module 704, the processor module 706, the display module 708, the reservoir control module 710, the sensor module 104, the interface 106, and the sensor operation module 102. The core modules can employ the power module 712 to provide power thereto implementing, for example, a fuel cell (e.g., 1 to N modules, where N is an integer), a battery storage (e.g., 1 to M modules, where M is an integer), an energy harvesting technique (e.g., 1 to P, where P is an integer), a micro-generator (e.g., 1 to X modules, where X is an integer), a storage capacitor (e.g., 1 to Y modules, where Y is an integer), etc. The power module 712 may be comprised of an interface to an external power source such as from an AC supply or a DC power supply. It is to be appreciated that the power module 712 can provide any suitable energy requirements for the core modules and any additional modules. One or more of each power modules such as the ones mentioned above may be used.

Figure 8:
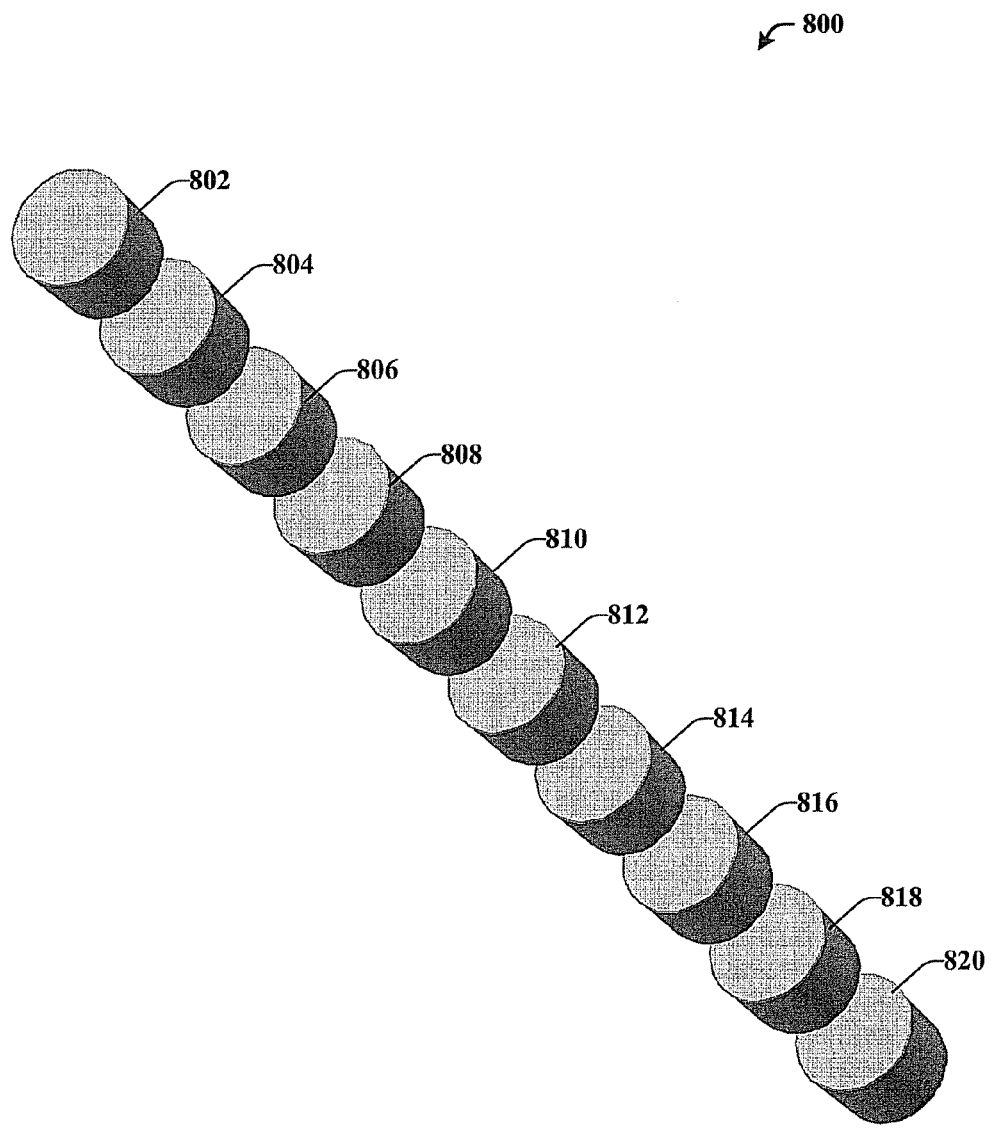
FIG. 8 illustrates a block diagram of an exemplary architecture that facilitates implementing a modular, configurable, and scalable intelligent fluid sensor architecture based on application needs.

Referring now to FIG. 8, an architecture 800 that facilitates implementing a modular, configurable, and scalable intelligent fluid sensor architecture based on application needs is illustrated. The modular architecture 800 can include a plurality of modules, wherein each module can provide a particular functionality to meet sensor needs and/or requirements. It is to be appreciated and understood that the modular configuration of the depicted architecture 800 can include a variety of combinations and/or components and the architecture 800 is not to be limiting on the subject innovation. Furthermore, it is to be appreciated that although not illustrated, each module can include a suitable interface to provide connectivity between modules. One or more of each module type may be present and modules of the same type may be adapted, tuned, or configured to function as an element in the complete sensor architecture 800.

The modular architecture 800 can include various modules based at least in part upon the parameter to be measured in real-time, a particular environment, a sensing need, an analysis need, fluid alteration need, calibration need, control need, display need, actuation need, communications need, a compatibility of disparate modules, etc. In particular, the modular architecture 800 can include an additive/oil reservoir control module 802 that can control the reservoir intake and/or discharge of oil and/or any suitable sample. In addition, the additive/oil reservoir control module can control the amount of additive to be utilized with the sample. For instance, the oil can be, but not limited to, oil, wherein the additive/oil reservoir control module 802 can ascertain the amount of sample to take in, when to discharge such sample, and the like. Similarly, the modular architecture 800 can include an additive/oil fluid reservoir module 804 that can provide store additives, house a sample fluid and/or oil, etc. It is to also be appreciated that there can be any number of additive/oil fluid reservoir modules from additive/oil fluid reservoir module 1 to additive/oil fluid reservoir module N, where N is a positive integer.

A communication module 806 can be employed with the modular architecture 800 to provide any suitable communications based on a sensing need, a measure parameter, an environment, and the like. For instance, a modular sensor can be implemented within a batch or continuous process such as frying in cooking oil to provide real-time in situ oil condition measurements. The modular sensor can implement the communication module 806 that can include a wireless transponder to communicate the collected data to a disparate sensor, component, system, machine, operator, controller, etc. Moreover, the communication module 806 can provide communication techniques and/or real-time data transfer to a system, component, sensor, device, machine, controller, etc. For instance, the communication module 806 can provide 4-20 MA, Intellibus, Ethernet, DeviceNet, Zigbee, IR, RFID, wireless communication, Wi-Fi, near-field communication (NFC), wireless Ethernet, wireless sensor network (e.g., IEEE 802.15.4), etc.

The modular architecture 800 can further include a local display module 808 that can provide display of local data associated with the configured sensor based on the environment, parameter to be measured, sensing needs, etc. The local display module 808 can house and/or provide a Tri-state LED, micro-LCD, On-Off LED, monitor, and the like. The local display module 808 can allow data to be displayed, wherein the data can be, but is not limited to, connectivity, real-time data, sensor activity, power consumption, communication activity, machinery health, process condition, production quality, fluid condition, control recommendations, control action initiated, operating cost, remaining time until failure, shutdown, or fluid depletion, etc.

A power module 810 and a disparate power module 812 can be implemented with the architecture 800 to provide a specifically tailored power supply based upon the configuration of modules, the parameter to be measured, the environment, duty cycle, communication requirements, etc. The power module 810 can be, for instance, a fuel cell, wherein there can be any number of power modules 810 such as 1 to N, where N is a positive integer. The power module 812 can be, for instance, a battery storage for the architecture 800. Similarly, there can be any number of power modules 812 from 1 to M, where M is a positive integer. In addition to the power module 810 and the power module 812, the architecture 800 can include a power module 814 that can harvest energy and/or provide any suitable energy harvesting technique (discussed infra). It is to be appreciated that the power modules 810, 812, and 814 can provide wired power connections, embedded stored power (e.g., batteries, capacitors, micro-fuel cells), or self-powered by extracting power from the environment or any combination of one or more of the previous powering methods. For example, power for the architecture 800 can be provided by one or more of converting vibration to power (e.g., using a piezo-electric beam that vibrates from a vibrating environment), photovoltaic cells, thermal gradient (e.g., thermoelectric devices), fluid flow (e.g., rotating micro generator with a paddle), changing magnetic field, or through movement of a magnet in a coil (e.g., turbulence induced movement), converting process fluid to energy, or other known power generating mechanisms (e.g., movement of a charged capacitor plate) that may be utilized in the environment that it is placed and/or positioned).

A memory storage module 816 can provide a black-box functionality that can provide suitable storage for any data associated with the modular architecture 800. For instance, the memory storage module 816 can provide an internal hard drive, wherein various data associated with measured parameters, module(s) identification, environment, configurations, settings, adjustments, and the like can be stored. For instance, various data related to the memory storage module 816 can be stored for extended time periods and/or can be communicated to a disparate entity and/or component utilizing the communication module 806. The modular architecture 800 can further include an electronics amplifier and digital processor module 818. The electronics amplifier and digital processor module 818 can provide any suitable electronic amplification for signals received/transmitted as well as any processing related to the modular architecture 800. Thus, the electronics amplifier and digital processor module 818 can be specifically tailored for any process, application, environment, functionality, parameter, and the like. In addition, the modular architecture 800 can include a multi-parameter sensor element 820 (e.g., also referred to as the sensor module and/or sensor component) as described in previous figures. It is to be appreciated that the following modules can be included in addition to the modular architecture 800 although not depicted for the sake of brevity: a fluid management module that can extract, hold, process, and then release a small sample of fluid from a reservoir; a storage reservoir module that can consist of one or more storage reservoirs of fluid to promote testing, cleaning, or purifying the fluid; a calibration module that monitors system operation and prescribes a need for re-calibration and can perform the recalibration in cooperation with the other modules; and a re-calibration module that can include storage of know, calibrated fluids, a processor, memory, and fluid handling capabilities. Moreover, it is to be appreciated that the following modules can be implemented: an IR module; an NIR module; a Raman module; a tHz module; a reaction module, a filtration module, a UV module, an ion exchange module, a turbidity module; and an incubation module with controlled environments (e.g., temperature, pressure, reagents, nutrients, etc.) or other function-specific process or integration activity.

Figure 9:
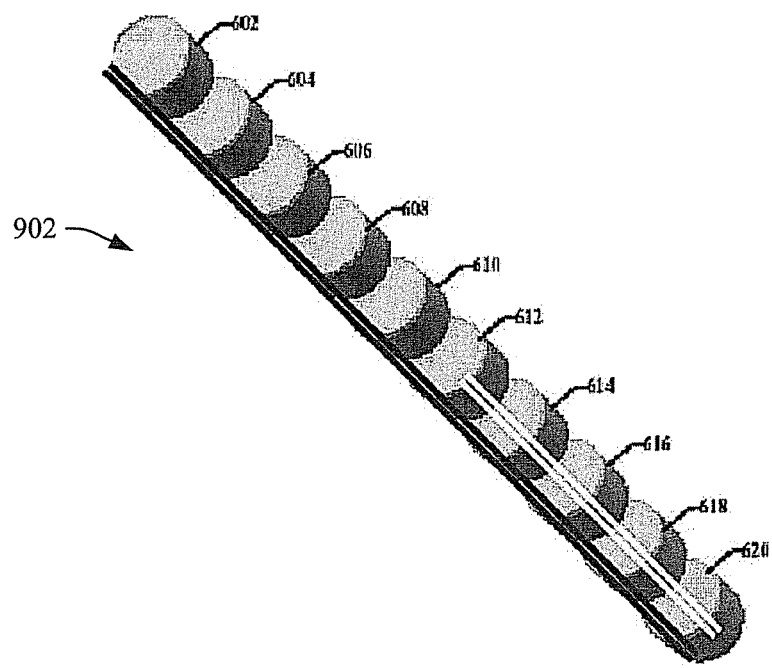
FIG. 9 illustrates a block diagram of an exemplary architecture that utilizes a backplane for data communication.
Figure 9:
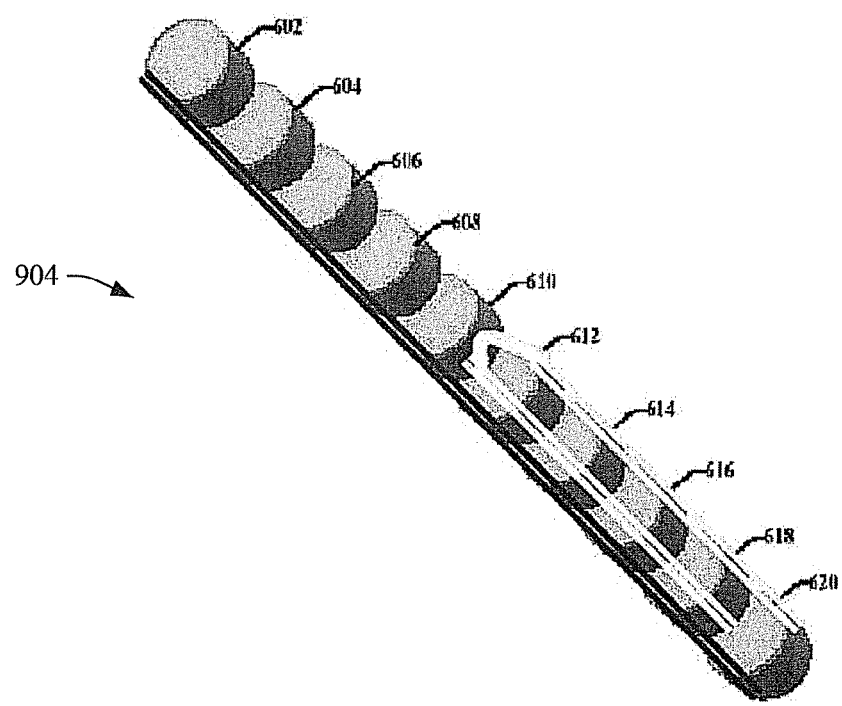

FIG. 9 illustrates an architecture that can utilize a backplane in connection with the claimed subject matter. The architecture can be of a backplane type. At 902, such a backplane architecture is illustrated in connection with the modular, configurable, intelligent sensor system. For example, a data, information, and control backplane can be initiated between each module in the architecture. While a disparate connection can connect to a select number of modules to implement a fluid backplane. Multiple sensor modules can gain access to the fluid through this backplane structure. The flow line may be bi-directional providing flow in and out of the same flow line (as seen at 902) or a single directional as seen at 904 providing a loop of flow each sensor module may tap into. The modules need not be in a linear organization as depicted. Such modules may be in a large group sharing a backplane as suggested above of they may be grouped into logical clusters. Communications may be among groups of modules rather than all modules communicating with all other modules. This configuration also supports implementing each module as an autonomous agent. The framework of autonomous agents directly supports dynamic re-configuration. Moreover, the multiple sensor elements can be connected using a backplane architecture that may be physically connected together or remote and connected only via the backplane lines (e.g., power, control, and/or fluid).

Multiple modules in a sensor system can operate using an intelligent agent framework. Multiple sensor systems can also operate in a collaborative mode using an autonomous agent framework, distributed computing or collaborative framework. For example, a sensor system monitoring engine oil may detect the slight presence of fuel. This information can be relayed to the fuel monitoring sensor system to check pressure, fuel level, flow rates, and oil contaminants present. The collaborative results of these two sensor systems can more accurately establish that there is a leak from the fuel system to the oil system.

Figure 10:
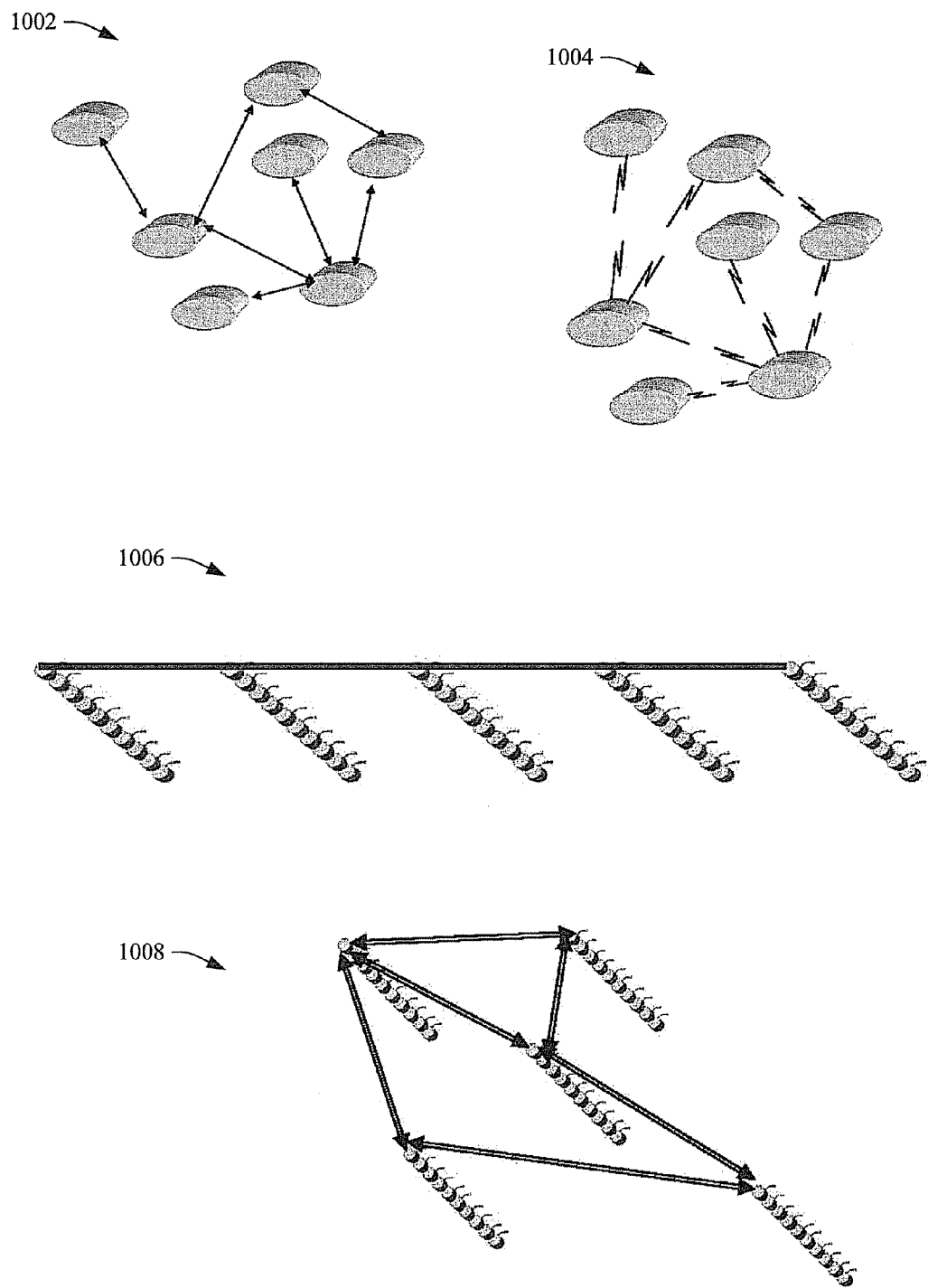
FIG. 10 illustrates a block diagram of an exemplary architecture that provides communication between modules and/or modular systems.

Turning briefly to FIG. 10, it is to be appreciated that the different modules in the modular system may exchange information and data via a wired link (e.g., backplane or wired link) and/or the modules may also exchange information using a wired sensor network link (e.g., Intellibus or AS-I) as seen in FIG. 10 at 1002. Moreover, the modular system may exchange information via a wireless link (e.g., IEEE802.15.4) as seen in FIG. 10 at 1004. In this case each module will have a respective wireless chip set for communicating information and coordinating operation. The modular system may also exchange information via a combination of wired and wireless links (not shown). Moreover, the modular system (e.g., comprising at least two or more modules) can communicate via a backplane and/or any suitable data connection to a disparate and/or multiple modular systems as depicted at 1006. In addition, the modular system can independently communicate to a disparate modular system and/or a plurality of modular systems in a non-linear manner as depicted at 1008. Multiple of sensor systems may be further connected using a bridge between systems such as 1006 and 1008 forming a multi-level or multi-layer hierarchy of sensor systems. Higher level systems may perform duplicate, redundant, complementary or supervisory functions relative to the lower level sensor systems.

Figure 11:
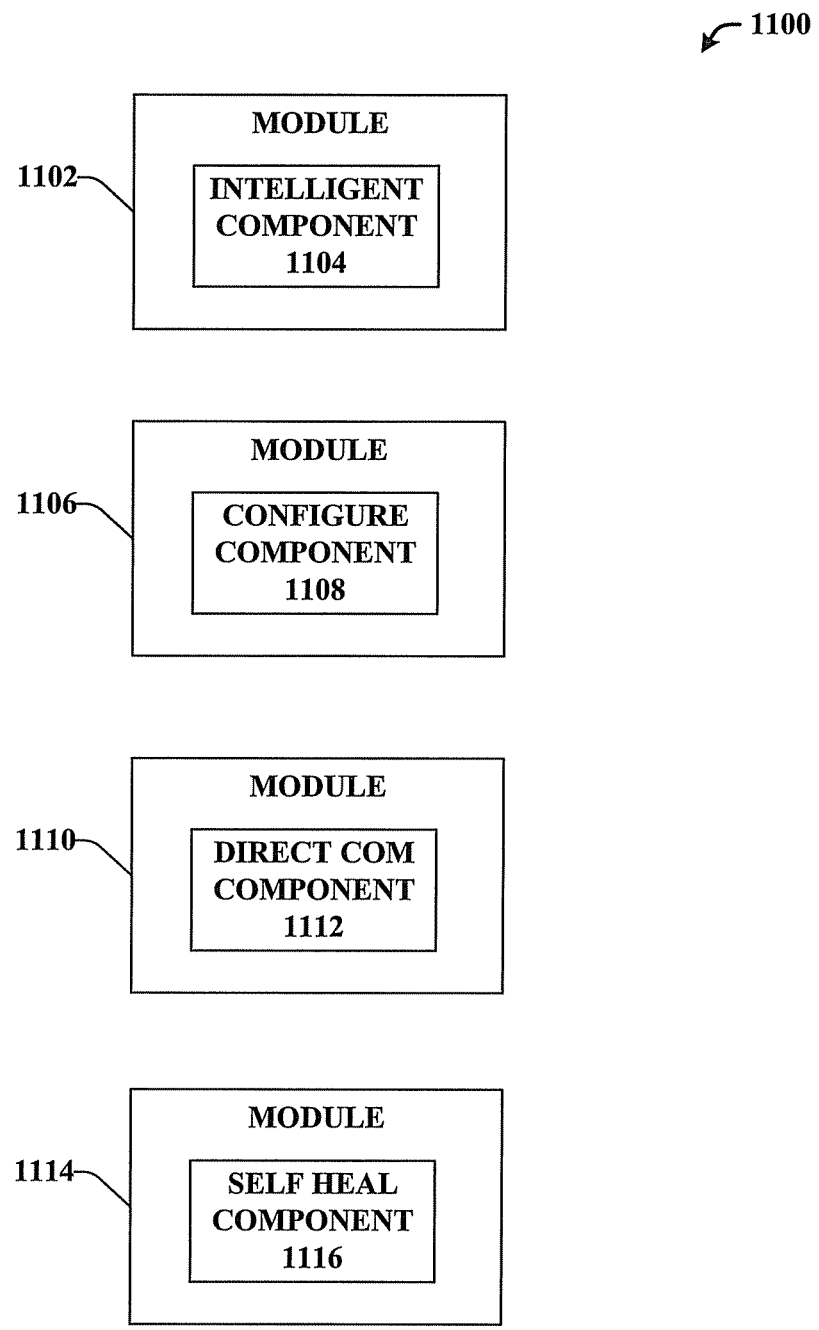
FIG. 11 illustrates a block diagram of exemplary modules that facilitate providing various functionalities to a modular and configurable real-time data sensor.

FIG. 11 illustrates a plurality of modules 1100 that facilitate providing various functionalities to a modular and configurable real-time sensor system. It is to be appreciated that the module architecture described herein provides a suite of functional and logical modules that can be readily assembled in many different combinations. Various operations for communications, power, memory, and sensor types are readily selected, and configured into an applications specific intelligent sensor system. The modules 1100 facilitate providing a configurable, modular intelligent sensor system that can be re-configured, updated, and implemented on a module-by-module basis allowing a plurality of combinations and sensor configurations satisfying any particular sensing need and/or requirement. The modular architecture can include functional building blocks such as, but not limited to, sensing, processing, power, storage, packaging, and communications. Associated with the modular architecture can be an extensible and configurable hardware and software framework that permits readily specifying, constructing, programming, and deploying a reconfigurable intelligent sensor system. Moreover, the sensor building blocks can conform to the architecture that permits integrating multiple modules for expanded performance, long duty cycle requirements, continued operation during component degradation, depletion, failure or damage, or redundancy (e.g., highly-reliable and ultra-reliable applications, etc.).

In addition to the previously described modules, a module 1102 can be included to the modular architecture that can include an intelligent component 1104. It is to be appreciated that the components described within the modules discussed below can be incorporated into any module previously described and/or a stand-alone and combinable module to the architecture. The intelligent component 1104 can provide self configuration based upon various data received, analyzed, and/or provided. For example, the module 1102 and the other modules combined therewith can be self-configured to measure and/or provide analysis for a particular environment, parameter, etc. For instance, any module provided with a particular combination of modules to measure a parameter in real-time can include the intelligent component 1104, wherein each module can communicate with each other to provide an accurate and/or appropriate configuration. In particular, a modular sensor architecture can include a processor module, a sensor module, a memory module, and a power module, wherein each module can have a configuration ascertained by the intelligent component 1104 by analyzing the modules combined together. Thus, the intelligent component 1104 can provide at least one of the following in connection with the above example: configure power compatibilities related to the power module to the based on the totality of modules combined; configure the sensor module to be compatible to the processor module, memory, and/or other modules combined; configure the processor module to seamlessly process data associated with the modular combination; and configure memory according to the combination of various modules utilized.

A disparate module 1106 can be utilized with the modular architecture which can include a configure component 1108. The configure component 1108 can provide internal configuration (e.g., via a processor module/component, stored settings on a memory module/component, etc.), external configuration (e.g., a user, data received, etc.), and/or any combination thereof. It is to be appreciated that the configure component 1108 allows for configuration in general, while the intelligent component 1104 can provide self-configuration capabilities with little or no user input. Thus, the configure component 1108 allows user default and/or set configurations to be applied to any module, component, and/or entity associated with the module architecture such that each module can be utilized efficiently, accurately, and/or error-free. For example, the configure component 1108 can include particular configuration settings for the particular module included therewith (e.g., each module can include the configure component 1108 can any suitable configuration data necessary to provide a working and error-free modular-based sensing architecture that provides an intelligent sensor system).

In another example, the architecture can include a module 1110 with a direct communication component 1112 (herein referred to as direct com component 1112). The direct com component 1112 can provide direct communication with disparate modules associated with the modular sensing architecture combined to provide and/or meet a desired sensing need. For instance, if a particular sensing need (based on the environment and/or parameter) can utilize five (5) modules, the direct com component 1112 can allow direct communication between at least two modules. Thus, the modules can communicate data between each other accordingly, allowing seamless data communication and utilization to provide real-time analysis, adjustments, updates, etc. Moreover, the modular-based sensor architecture can combine a module 1114 that can include a self-heal component 1116. Based on the seamless data communication between modules and/or components, the self-heal component 1116 can provide error-correction, manipulations, and/or other adjustments to correct any detected faults, errors, and the like. Thus, the self-heal component 1116 can evaluate the module architecture as a whole, an individual module, and/or any combination thereof to evaluate an error and provide a suitable correction with or without user intervention. Note that multiple re-configurable sensor systems can communicate with each other and share fluid and environment information and analysis results. The multiple fluid modules may collaborate to achieve a superior fluid analysis and can rely on other sensor systems to continue operation during degraded, depleted, damaged, failed, or un-calibrated local modules would normally require a shutdown.

Figure 12:
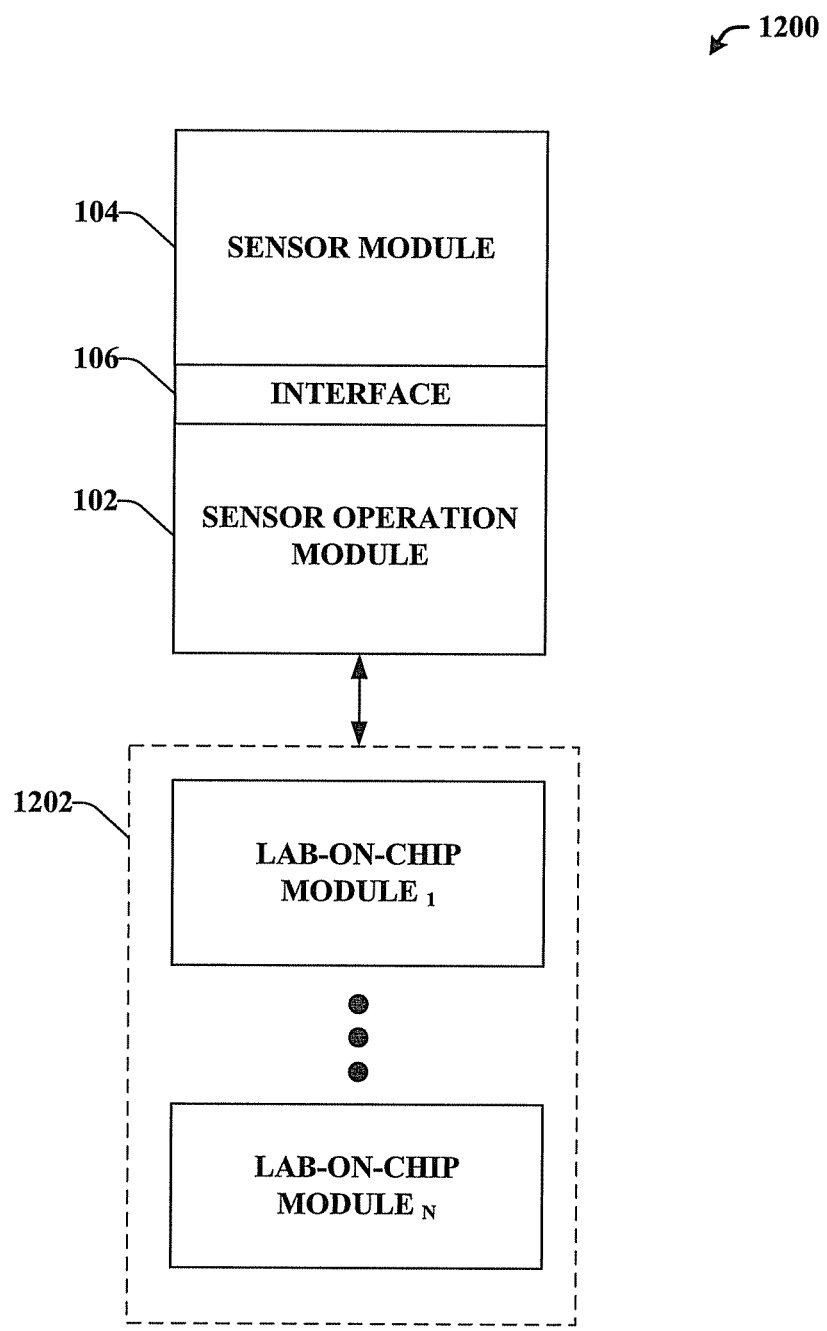
FIG. 12 illustrates a block diagram of an exemplary architecture that facilitates employing a modular-based real-time sensor with expandable modules that utilize lab-on-chip capabilities.

FIG. 12 illustrates an architecture 1200 that facilitates employing a modular-based real-time sensor with expandable modules that utilize lab-on-chip capabilities. The architecture 1200 can be expanded and/or specifically tailored for applications and/or to add various functionalities to provide real-time in situ measurements for a parameter within an environment. In one example, PC communications software can be part of the system for design, configuration, setup, downloading, calibration, re-configuration, troubleshooting, analysis, etc. As depicted, a plurality of function-specific modules can be added to the sensor module 104 and/or the sensor operation module 102 (referred to as the "core modules" based on providing the core functions of collecting real-time data and recording the real-time data respectively).

The core modules can be expanded to include a lab-on-chip module 1202 which can provide lab-on-chip capabilities that are specific to a particular sensing need. For example, specific laboratory procedures can be incorporated into a module(s), wherein each laboratory step and/or procedure can be provided utilizing the module(s) rather than utilizing a physical laboratory and/or testing. The lab-on-chip module 1202 can include any suitable number of laboratory steps and/or procedures, wherein each step and/or procedure can be housed within a respective lab-on-chip module or the totality of the lab-on-chip procedures and/or steps can be included within a single module. As depicted, the lab-on-chip can include any necessary number of procedures and/or steps such as lab-on-chip 1 to lab-on-chip N, where N is a positive integer. For instance, the lab-on-chip module 1202 can provide sample preparation, sample testing, analysis, additive tests, any suitable lab function, heating, cooling, filtering, straining, color sensing, pH sensing, titration tests, precipitate tests, holding, incubation, species injection, electrolysis, turbidity tests, bio-reaction, chemical reaction, filtration, IR, NIR, FTIR, RAMAN, hydrolysis, oxidation, dilution, etc. Furthermore, the lab-on-chip module 1202 steps and/or procedures can be implemented in parallel, serial, and/or any combination thereof.

For example, a total acid number (TAN) test kit and a total base number (TBN) test kit is commercially available and consists of multiple test tubes for sample extraction, reactive fluid, and mixing chambers. Test kit functions are intended to be manually performed by an operator or lab technician using a fluid sample extracted from machinery. The lab-on-chip system described above can perform the same sequence of sample extraction, mixing, holding, blending, and analyzing in a single integrated on line system rather than manually. The TAN test kit can include multiple test tubes and ampules containing reagents. The ampules can be broken to release fluids during a series of manual test steps. These steps can be done in the field and are intended to replace the more complex laboratory titration test to determine TAN. The multiple modules proposed here can do this series of blending, mixing, reacting, holding, and evaluation.

Figure 13:
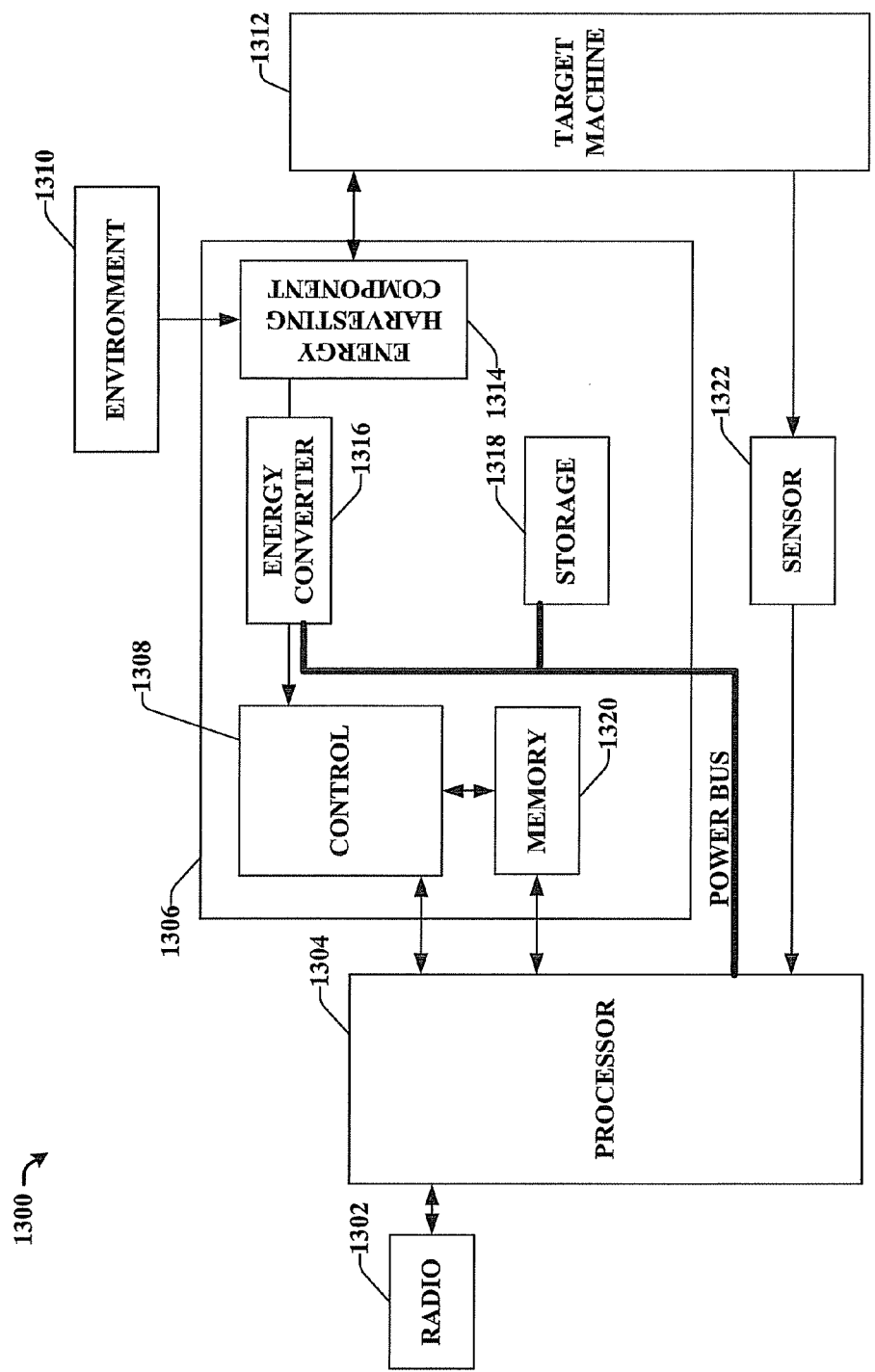
FIG. 13 illustrates a block diagram of an exemplary system that facilitates utilizing an energy harvesting system architecture in accordance with the subject innovation.

FIG. 13 illustrates a system 1300 that facilitates utilizing an energy harvesting system architecture in accordance with the subject innovation. The system 1300 can include various components that can be packaged into a single module and/or each component can be packaged into a respective module, wherein the system 1300 can be considered components of a self-powered sensor node. It is to be appreciated that the system 1300 can be implemented in a modular architecture. The system 1300 can harvest power from stray energy for remote sensors (e.g., modular, configurable, expandable core modules). The system 1300 can provide periodic sampling from sensors which may be distributed across a machine, a vessel, and/or a facility. Remote sensor processing can typically be performed periodically and at a frequency consistent with the rate of local power generation and application requirements. Newer materials such as certain piezo-electric composite materials can exhibit high coupling efficiencies and other high efficiency piezo-electric ceramic materials can operate at elevated temperatures. Such materials can be utilized for vibration and/or ultrasonic sensing and are effective for power scavenging devices.

The system 1300 can include a radio 1302 that communicates with a processor 1304. The system can include an energy harvesting module 1306 that can provide energy harvesting. The energy harvesting module 1306 can include a control 1308 that can provide, for instance, power conversion and control circuitry. The energy harvesting module 1306 can draw energy from an environment 1310 and a target machine 1312. For example this may be a gearbox, a motor, a centrifugal pump, a multi-stage compressor or an oil purifier. Moreover, the energy harvesting module 1306 can include an energy harvesting component 1314 such as a piezo-electric cantilever beam, an energy converter 1316, a storage 1318 (e.g., capacitor bank), and a memory 1320. The system 1300 can also include a sensor 1322 (e.g., an accelerometer) that can receive data from the target machine 1312 and communicate to the processor 1304. In addition, the system 1300 can further include a power bus. The energy harvesting component 1314 and the sensor 1322 may be integrated together in the same enclosure or they may be distant from each other and connected via a cable. For example, the location most suitable for generating energy may be on a mounting bracket while the location most suitable for detecting machinery fault may be on a motor end-bracket. More than one energy harvesting component 1314 may be employed. The multiple energy harvesting components 1314 may be used to increase the power generated, they may be tuned to different characteristics over the expected operating range of the machinery (e.g., each generator module may be tuned to maximize energy generated at specific ranges of vibration frequencies and/or amplitudes, or may be comprised of multiple different modes of energy harvesting as described previously (e.g., photovolatics, piezo-electric cantilever beam, moving magnet in a coil, etc.).

Figure 14:
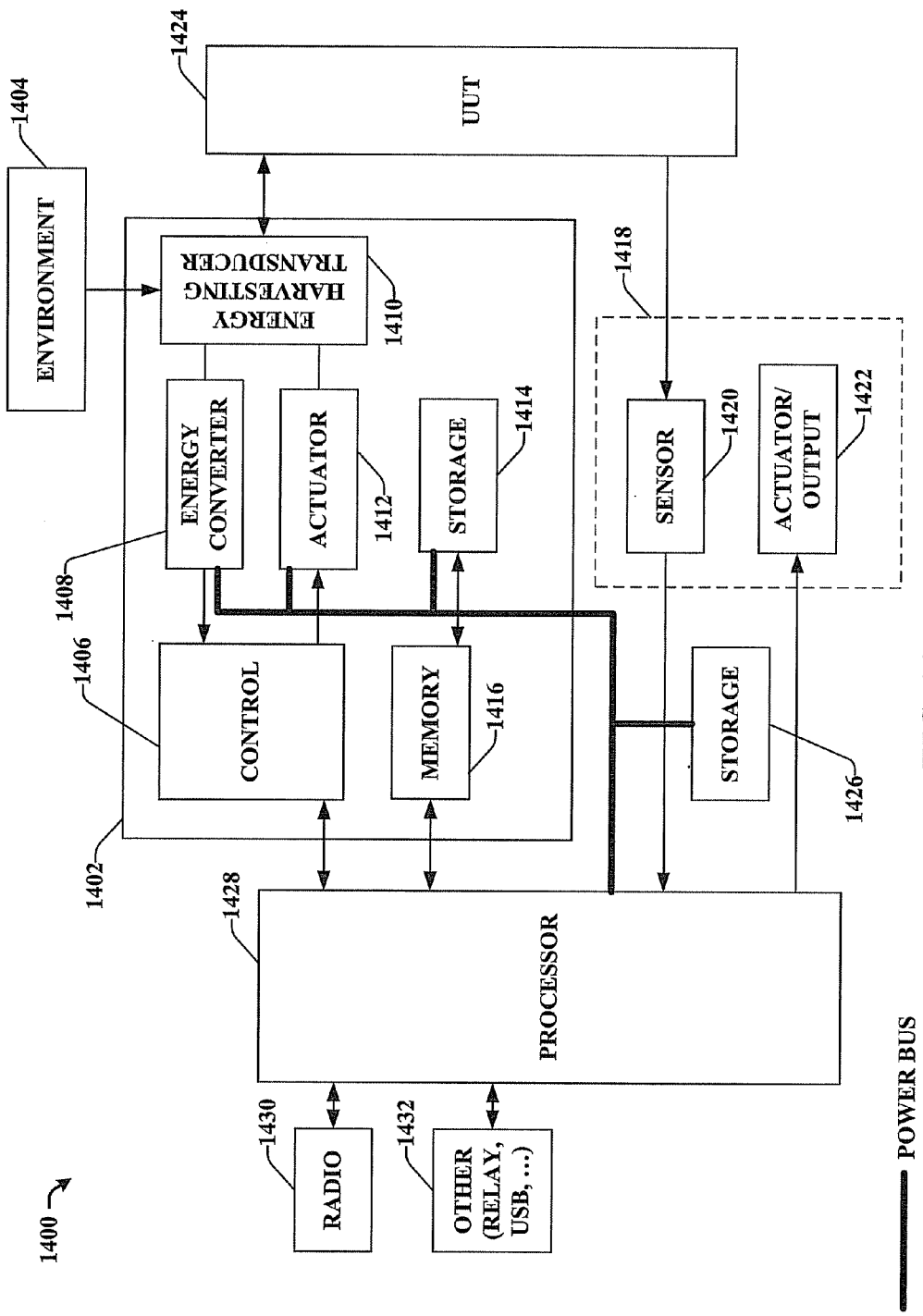
FIG. 14 illustrates a block diagram of an exemplary system that facilitates utilizing an energy harvesting system architecture in accordance with the subject innovation.

FIG. 14 illustrates a system 1400 that facilitates utilizing an energy harvesting system architecture in accordance with the subject innovation. The system 1400 can include an adaptive harvesting module 1402 that can harvest energy from an environment 1404. The adaptive energy harvesting module 1404 can include a control 1406 (e.g., power control, energy management, etc.), an energy converter 1408, an energy harvesting transducer 1410, an actuator 1412, a storage 1414 (e.g., an energy storage, a secondary storage, etc.), and a memory 1416. The actuator 1412 can operate in conjunction with other components in the energy harvesting module 1402 to adaptively and dynamically "tune" the energy harvesting transducer 1410, energy converter 1408, or other elements in the energy harvesting module. Adaptive, dynamic tuning is performed to maximize energy generated in response to changing machinery conditions and/or changing environments and/or changing equipment capabilities and/or changing operating requirements. The system 1400 can further include an optional sensor 1418 that can include a sensor 1420 and an actuator/output 1422. The optional sensor 1418 and the adaptive energy harvesting module can interact with a unit under test (UTT) 1424. In addition, the system 1400 can include a storage 1426 (e.g., energy storage, primary storage, etc.), a processor 1428, a radio 1430, and an other component 1432 (herein referred to as "other") (e.g., relay, universal serial bus (USB), etc.). It is to be appreciated that the system 1400 can further employ a power bus as illustrated.

Figure 15:
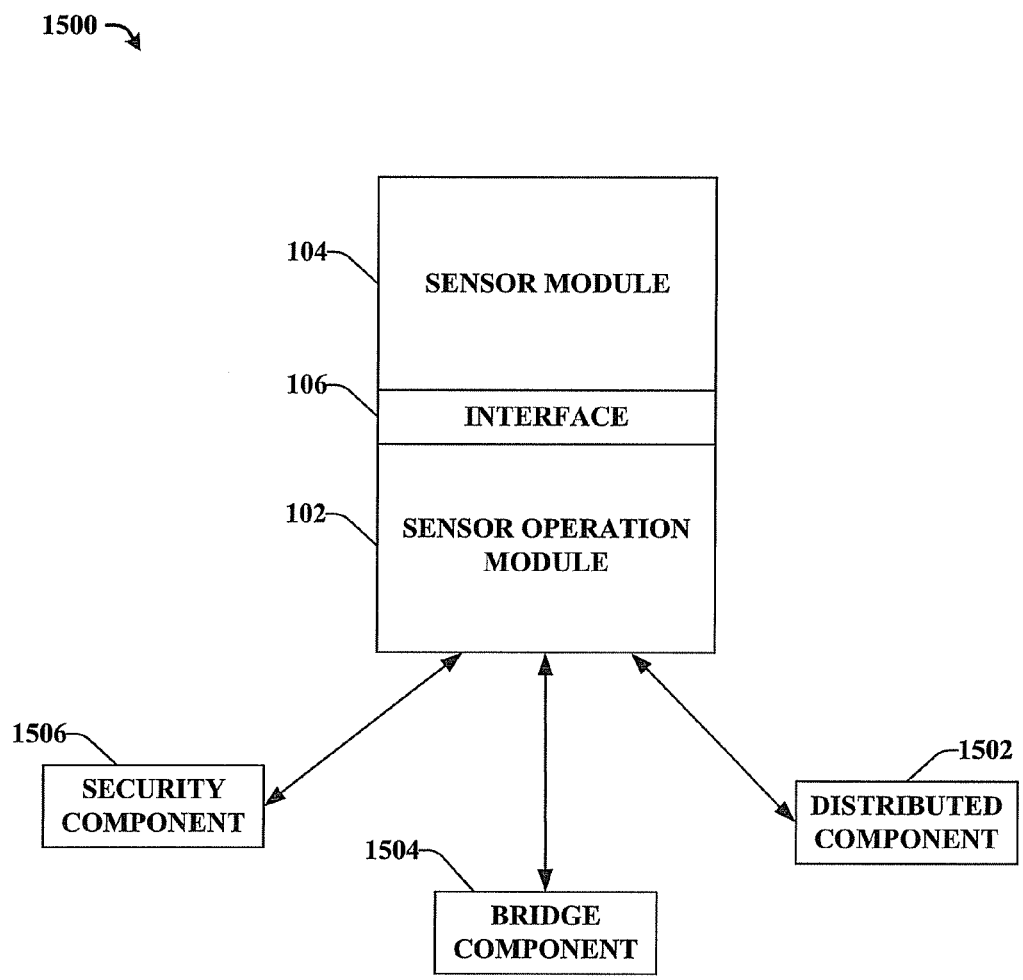
FIG. 15 illustrates a block diagram of an exemplary system that facilitates employing a modular-based real-time data sensor in an environment to measure at least one parameter.

FIG. 15 illustrates a system 1500 that facilitates employing a modular-based real-time data sensor in an environment to measure at least one parameter. The architecture 1500 can be expanded and/or specifically tailored for applications and/or to add various functionalities to provide real-time in situ measurements for a parameter within an environment. In one example, PC communications software can be part of the system for design, configuration, setup, downloading, calibration, re-configuration, troubleshooting, analysis, etc. It is to be appreciated that a plurality of function-specific modules can be added to the sensor module 104 and/or the sensor operation module 102 (referred to as the "core modules" based on providing the core functions of collecting real-time data and recording the real-time data respectively).

The core modules can further utilize a distributed component 1502 that facilitates distribution of the real-time data collected by the sensor module 104 to systems and/or components. The distributed component 1502 can utilize at least one of a directory service, a caching service, a database service, a blackboard architecture, and agent interface function, an archiving service, a trending and historical analysis service, statistical analysis service, operator advisory service, remote monitoring service, black-box recording service, and/or a storage service to enable the real-time data to be distributed to a participating system. Moreover, the distributed component 1502 can provide the distribution of the real-time data to a participating system during a communication outage and/or loss. In particular, the distributed component 1502 can provide collected data to particular components, systems, controller, operators, and the like based at least in part upon a subscription to receive such data. For example, a controller operator can request subscription to receive real-time data collected by the sensor module 104, wherein (upon approval) the controller operator can receive real-time data from the sensor module 104 and/or data analysis from the sensor operation module 102 through the distributed component 1502.

The system 1500 can further include a bridge component 1504 that facilitates networking within the environment that employs industrial automation. In other words, the bridge component 1504 can act as a network bridge. Thus, data carried by disparate networks can be manipulated so that it conforms to a common network. Accordingly, the bridge component 1504 can recognize a network protocol associated with received instructions related to a controller (not shown) and perform operations to convert such data so that it conforms to a pre-defined protocol. Upon such conversion, a mapping can be employed to convert the data so that it conforms to a particular data model (e.g., XML model or FIPA model or OSA-CBM model or MIMOSA model or ISA model). The mapping can thereafter provide data to a requester of such data over a network, wherein the network conforms to the pre-defined protocol. For instance, the first network protocol can be at least one of Fieldbus, DeviceNet, Ethernet, Profibus, Hart, Modbus, ASI-bus, and Foundation Fieldbus, while the second network protocol can be a Common Industrial Protocol (CIP). An IP address may be uniquely assigned to each instance of the distributed component 1502.

Moreover, the bridge component 1504 can support various disparate networks for the communication of the distributed transaction such as, but not limited to, Ethernet, ControlNet, DeviceNet, USB, Fieldbus, IEEE802.15.4, Bluetooth, Zigbee, etc. In other words, the system 1500 utilizing the bridge component 1504 can be network agnostic. In addition, the bridge component 1504 can support both open and where necessary proprietary protocols to communicate data over the various disparate networks. It is to be appreciated that the bridge component 1504 can be a wireless device such as a wireless Ethernet 802.11b or a low power sensor network (e.g., 802.15.4, bluetooth, etc.) or a power-line network (e.g., X10) or a hardwired communications line (e.g., RS232C or DeviceNet). For example, a function of the distributed component 1502 may be to interrogate a remote central database of fluids and faults to correlate the currently observed fluid symptoms to establish an accurate diagnosis of the fluid condition, the fluid remaining useful life, the machinery condition, estimated remaining fluid life, running time until failure, maintenance action required, and/or the recommended action to prolong operation.

The core modules can also implement a security component 1506 that provides enhanced security measures to ensure the integrity of any data manipulation related to the system 1500. In other words, the security component 1506 can utilize a security mechanism with at least two or more levels in relation to any modifications and/or manipulations of any process, application, settings, control, state transitions, operator access, operator actions, configurations, and/or data associated with the system 1500. In one example, the security component 1506 can provide usernames and respective passwords that can be associated to specific real-time data, process, application, settings, capabilities, configurations, manipulation privileges, etc. In accordance with another aspect of the claimed subject matter, the security component 1506 can provide security at a granular level and/or global manner based at least in part upon the environment. In particular, the security component 1506 can define security, authorization, and/or privileges in accordance with the physical hierarchy of the industrial automation environment, wherein sectors and/or portions of the environment can be associated to a specific security level that the real-time collected data is associated therewith. The system 1500 can employ logic to dynamically protect the process, product, or process equipment. The security component 1506 may additionally establish profiles of usage, traffic, protocols, and data to classify system operation, control, and data related to security threat, integrity loss, or accidental faulty or malicious operation. For example, the detection of atypical or anomalous operation or interaction may trigger implementation of a more strict set of user privileges along with communicating a warning via the bridge component 1504 to other sensor modules and to authorities all without operator notification.

Figure 16:
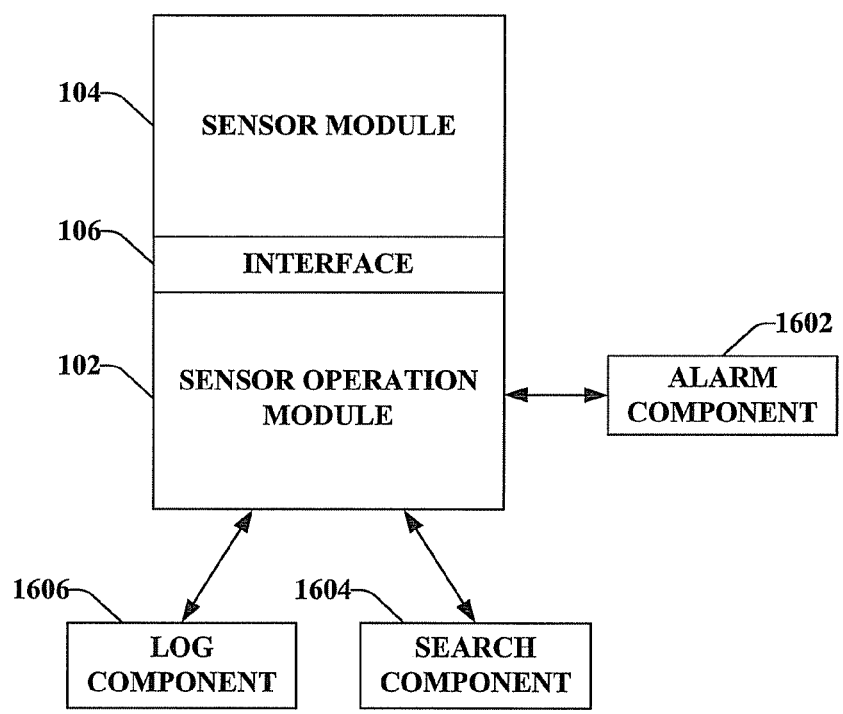
FIG. 16 illustrates a block diagram of an exemplary system that facilitates utilizing a real-time sensor that can be specifically tailored to a particular environment.

FIG. 16 illustrates a system 1600 that facilitates utilizing a real-time sensor that can be specifically tailored to a particular environment. The system 1600 can utilize an alarm component 1602 that can provide alarms and/or warnings associated with the environment based at least in part upon the real-time in situ measurements, detections, and/or data collections via the sensor module 104 and/or historical/nominal data. For example, the alarm component 1602 can implement an alarm and/or warning such as, but not limited to, sirens, bells, warning lights, pop-up screens, blinking data display items, graphical items, email, text, cellular communication, web site activity, etc. when a particular parameter or real-time analysis is beyond a specific threshold. In one example, the alarm component 1602 can sound a siren when a parameter measured in real-time is detected to be in a deteriorated condition. It is to be appreciated that the status and/or alarms can be stored in the data store (not shown), a "black box" recorder, etc. Additionally, the alarm component 1602 can signal a condition that will occur in the future to permit action to be taken before a fault occurs or before unsuitable product is produced. For example, an alarm may be provided if the measured parameter is acceptable but an unusual rate of deterioration is sensed. Additionally, an alarm may be provided to indicate a specific amount of useful production volume or operating time is left before a failure or before producing unsuitable product. In an example utilizing the modular sensing architecture in cooking oil for the production of a food product, an alarm may be sounded to indicate less than eight hours of frying time remains using the current frying oil and frying conditions. The results of this alarm may be used by a controller to reduce the frying oil temperature by 2° F. to significantly extend the useful life of the frying oil and prevent a premature process shutdown. In another case, a warning may be sounded to indicate the buildup of microbials that will be approaching an unacceptable level a prescribed time in the future. An alarm may also be issued to signal the near term depletion of an antimicrobial agent used to dynamically control the level of microbials in a fluid.

The core modules can further utilize a search component 1604 that allows querying of the system 1600. In particular, the search component 1604 can provide querying of any data collected by the sensor module 104, stored data, system data, the environment, analytical data, vendor data, historical data and/or any other data related to the system 1600 including data related to the product, process fluids, process machinery, process instrumentation, control techniques, simulation results, system analytic results, and quality data and analysis. For instance, a user can utilize the search component 1604 to discover data related to a particular sensor within a sector, in a particular environment and/or plant. It is to be appreciated that although the search component 1604 is illustrated as a stand-alone component, the search component 1604 can be incorporated into the sensor operation module 102, into the sensor 104, a stand-alone component, a separate module that can be combinable with disparate modules, and/or any combination thereof. It is to be appreciated that the system components can be distributed and remote from the environment and remote from each other such as accessible via Internet, Ethernet, etc. Furthermore, the search component 1604 may request information or results that do not reside in the sensor module 104 and that may never have been obtained by sensor module 104. Based on the current capabilities or capabilities through dynamic reconfiguration, sensor module 104 may queue the outstanding request and then sensor module 104 may proceed to obtain a sample and perform analysis as needed to satisfy the request initiated by search component 1604. Alternatively, sensor operation module 102 may determine that another sensor module has the specific information requested and notify search component 1604 and forward the request to the different sensor module.

In addition, the search component 1604 can further employ a log component 1606, wherein the log component 1606 can store and/or track various data related to the system 1600. For example, the log component 1606 can log collected data from a plurality of sensors housed within the sensor module 104 within an environment or multiple environments, track data manipulations to at least one of applications and/or processes within the system 1600. In another instance, the log component 1606 can log usernames and data access/manipulation associated therewith. Thus, a user B can access data W at time X, and modify process Y at time Z, wherein the log component 1606 can store which data was accessed/manipulated by user B and at which specific times and with context information such as the associated product, process, customer, supplier, or production staff for example.

Figure 17:
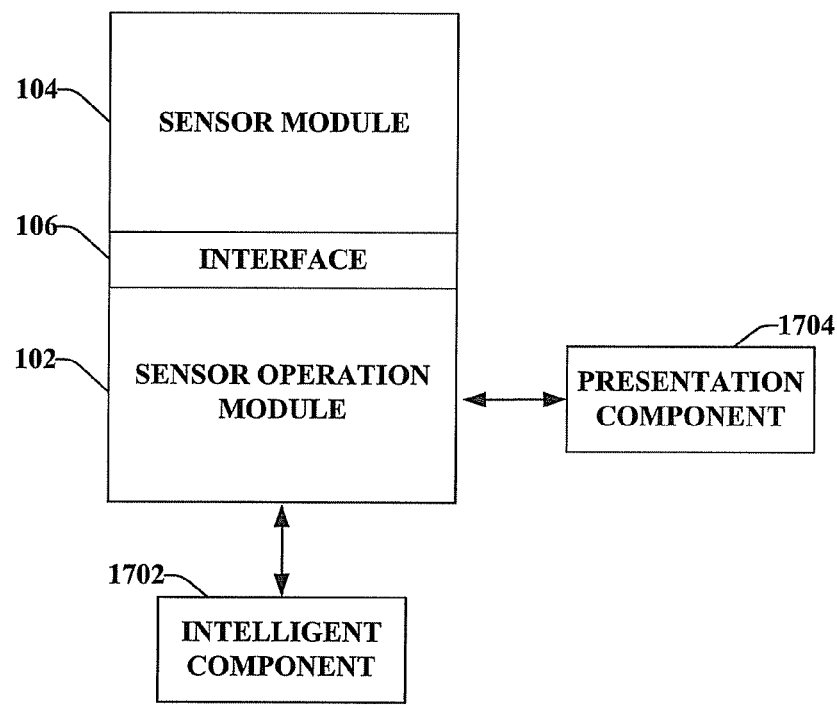
FIG. 17 illustrates a block diagram of an exemplary system that facilitates employing a modular-based sensor to provide real-time in situ measurements.

FIG. 17 illustrates a system 1700 that facilitates employing a modular-based sensor to provide real-time in situ measurements. The system 1700 can include the sensor module 104, a sensor operation module 102, and the interface 106 that can all be substantially similar to respective components and interfaces described in previous figures. The system 1700 further includes an intelligent component 1702. The intelligent component 1702 can be utilized by the core modules (e.g., the sensor module 104 communicatively coupled to the sensor operation module 102 via the interface 106) to facilitate providing a modular, configurable intelligent sensor system that can be specifically tailored for a particular process, application, a parameter to be measured, and/or a particular environment. For example, the intelligent component 1702 can infer process configurations, food, process and/or application settings, optimum process parameters, compliance to regulations, diagnostics of process and equipment, module settings between each other within the combined sensor package (e.g., the totality of combined modules to meet sensing needs), module power settings, sensor operation module configurations, sensor module calibration requirements, data quality metrics, module adjustments based on combined sensor package, communication settings, display settings, memory settings, processor settings, reservoir control configurations, etc. It is to be appreciated that there can be multiple core modules from 1 to N, wherein N is an integer greater than or equal to 1. Multiple intelligent components may also exist in connection with the core modules (e.g., internally, externally, and/or any combination thereof) and may exchange information and collaborate in analysis, training, action planning, and control.

It is to be understood that the intelligent component 1702 can provide for reasoning about or infer states of the system, product, equipment, control, process, environment, process operator, raw material, environment, and/or user from a set of observations as captured via events, states, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter. Various modeling techniques including qualitative and quantitative models, analytic models, neural net models, statistical models, expert system models and/or causal models may be employed. Following the initiation of action to the system, the continuous sampling and analysis performed by the sensor module and interpreted by the intelligent component 1702 can be used to confirm that the prescribed action as carried out and/or to further refine the process/plant/equipment/operator model employed by the intelligent component 1702.

A classifier is a function that maps an input attribute vector, $x=(x1, x2, x3, x4, \ldots xn)$, to a confidence that the input belongs to a particular class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models, analytic models, qualitative models and causal models providing different patterns of independence can be employed. Classification as used herein also is inclusive of statistical regression that is utilized to develop models of priority. Additionally, the module may identify a state that will be entered at a prescribed time in the future given assumption on operating conditions, control capabilities and environment. A probability may be assigned to the future state and time to enter this state. A suite of different future states may be provided each with associated assumptions, time parameters, and probabilities. The suite of future states permits making changes in equipment maintenance, materials, controls, and configurations to permit avoiding undesirable future states and insuring the most desirable (e.g., optimum, greatest throughput) states are entered when the time for a state transition occurs in the future.

A presentation component 1704 can provide various types of user interfaces to facilitate interaction between a user and any component coupled (e.g., hardwired and/or wireless) to the core modules (e.g., the sensor module 104, the interface 106, and the sensor operation module 102). As depicted, the presentation component 1704 is a separate entity that can be utilized with the core modules. However, it is to be appreciated that the presentation component 1704 and/or similar view components can be incorporated into the core modules and/or a stand-alone unit. The presentation component 1704 can provide one or more graphical user interfaces (GUIs), command line interfaces, LED indicators and the like. For example, a GUI can be rendered that provides a user with a region or means to load, import, read, analyze etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, data plots, animations and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the core modules. Other operator interface techniques including speech recognition, speech synthesis, warning tones, tower lights, flashing lights, information tones, acoustic alarm signals, augmented reality, artificial reality, 3D display, and animation techniques may be similarly employed.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. Text messaging may be done at a terminal or remote such as via Ethernet-enabled remote text messaging. A corresponding dialog may be carried out with the presentation component 1704 interpreting and responding to queries and control changes initiated from a remote device or remote process. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels. A module interface can also be provided to permit multiple modules to integrate information into a common display or to jointly reason about system states, faults, recommended action or new control or operation changes. The module interface can be one of any accepted formats such as, but not limited to, extensible markup language (XML). The core modules can be organized into an architecture to facilitate system operation or reasoning. Architectures can be any combination of star, ring, hierarchy, net, cluster, serial, etc.

Figure 18:
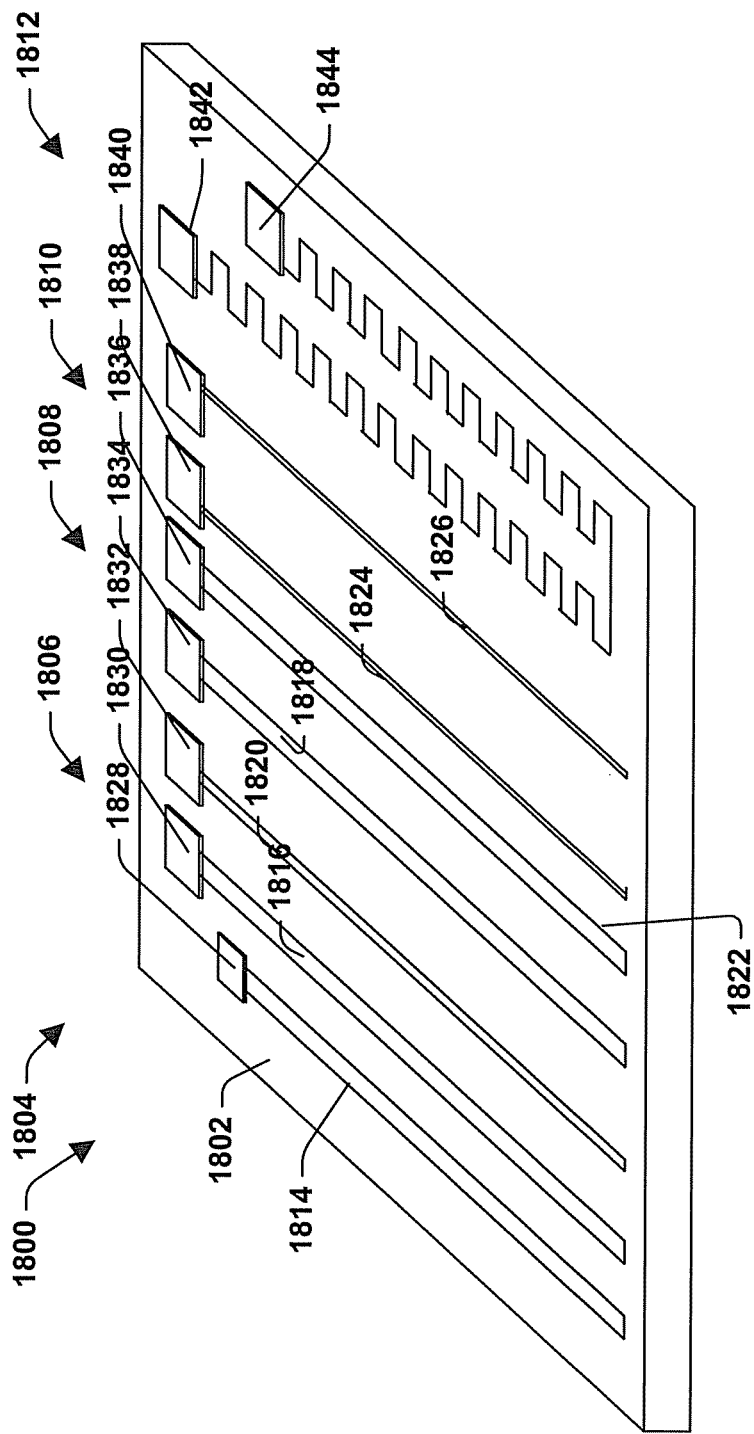
FIG. 18 is an exemplary multi-element sensor that can be utilized in connection with the present invention.

Referring now to FIG. 18, an exemplary micro electromechanical system type (MEMS-type) multi-element fluid sensor 1800 that can be employed in connection with the subject innovation is illustrated. The subject innovation affords for in situ monitoring of a variety of fluid parameters via a plurality of sensing devices (elements). A data fusion framework can be associated with the fluid sensor 1800 to facilitate condensing, combining, evaluating and interpreting the various sensed data. The sensor 1800 can be employed in rotating machinery that utilizes fluid as lubrication. In addition, the sensor 1800 can also be applied to measure various parameters of hydraulic fluids and cutting fluids, vehicle fuels (e.g., aircraft, marine, and land-based), food products (e.g., cooking oils), pharmaceuticals as well as biological fluids, water supply fluids, and environmental fluids. In accordance with one aspect of the subject innovation, the sensor 1800 can employ micro-fluidics or small-scale fluidic. For example, the sensor 1800 can be placed within a casing (not shown) comprising one or more aperture(s) that can be opened and closed. A sample of fluid can thus enter the casing when the aperture(s) are open, and can be confined within the casing when the aperture(s) are closed. The sensor 1800 can then be utilized for real-time in situ measurement, analysis, and maintenance of fluid within machinery or a process. The fluid sensor 1800 includes a semiconductor base 1802 that preferably comprises silicon, however, any suitable material may be employed. Located on the surface of the base 1802 are a plurality of sensing devices 1804 for sensing various parameters of a fluid. More particularly, the sensing devices 1804 include a pH sensor 1806 for sensing pH of the fluid, or the fluid acidity or baseness (TAN, TNN, TBN, etc.). An electrochemical sensor 1808 provides for sensing chemistry of the fluid, including oxidation levels of the fluid. A conductivity sensor 1810 provides for sensing electrical conductivity of the fluid. A temperature sensor 1812 provides for sensing temperature of the fluid. Additional sensing elements may be added including multiple of the sensing elements listed above either identical or with slight modifications to geometry and/or processing and/or coating and/or operation. Other sense elements may be integrated including accelerometers, pressure transducers, optical sensors (e.g., NIR), turbidity sensors, flow sensors, particle detectors, ferrous particle detectors, density detectors, biological oxygen demand (BOD) sensors, chemical oxygen demand (COD) sensors, radiation sensors, bio-sensors, and color sensors.

The pH sensor 1806 includes a reference electrode 1814 comprising any suitable material (e.g., Ag, AgCl) and a pH electrode 1816 comprising any suitable material (e.g., palladium-palladium oxide (Pd—PdO) or iridium-iridium oxide (Ir—$IrO_2$)). The pH sensor 1806 provides for sensing the pH of a lubricant or fluid being analyzed. An exemplary discussion relating to pH sensors is found in "A Pd—PdO Film Potentiometric pH Sensor, by Karagounis et al., IEEE Transactions on Biomedical Engineering, Vol. BME-33, No. 2, February 1986 which is hereby incorporated by reference in its entirety.

The electrochemical sensor 1808 is of a 3-electrode configuration that includes a reference electrode 1818 comprising any suitable material (e.g., Ag, AgCl), a working electrode 1820 (e.g. comprising Ag) and a counter electrode 1822 (e.g., comprising Ag). The chemical sensor 1808 is of a design typically used in conjunction with voltammetric and/or potentiometric techniques. It is to be appreciated that other suitable sensor designs including a 2-electrode or four electrode electrochemical sensor, may be employed. When either an AC or DC voltammetric signal is applied to the working electrode 1820, a response current is generated between the working electrode 1820 and the counter electrode 1822. The response current signal parameters vary depending upon the electrochemical processes occurring at the surface of the working electrode 1820. This mode of operation is termed potentiometric operation. The electrochemical processes are a function of the constituent concentrations, as well as the electrode material, coating material, electrode geometry, surface characteristics, electrical signal applied, and data acquisition characteristics. With sensor design and operation fixed, the response current from the sensor is therefore responsive to the fluid constituent concentrations. The electrochemical sensor is useful for determining the presence of contaminants like water, fuel, glycol, microbial agents, metal ions, other ions, unwanted chemicals, and/or oxidation, for example, in a fluid being analyzed.

Furthermore, the chemical sensor 1808 can be employed to reduce oxidation present in a fluid. Typically, an amount of oxidation present in fluid can be determined via cyclic voltammetric techniques. A voltage is cyclically ramped from a positive voltage to a substantially equivalent negative voltage, and a response current between the working electrode 1820 and the counter electrode 1822 is captured. Characteristic peaks in the current-voltage curve are driven by oxidation and reduction occurring in fluid that is in close proximity to the electrodes 1818, 1820, and 1822. Such an oxidation measurement technique may be ineffective in some conventional systems, as fluid is flowing and non-static, thus not allowing an oxidation and reduction cycle to complete near the electrodes 1818, 1820, and 1822. Oxidation levels of the fluid, however, can be effectively measured by confining a sample of the fluid comprising the sensor 1800. Moreover, as a sample of fluid is confined, the electrodes 1818, 1820, and 1822 can reverse oxidation in the sample of fluid via performing substantially more reduction on the sample of fluid than oxidation during the voltammetric cycle.

In many cases, oils and other non-aqueous fluids are non-polar fluids that exhibit a very weak electro-chemical response. As a result, extraction of a sample is required and the sample is chemically modified via an addition of a solvent or electrolyte. After such addition occurs, a voltammetric cycle can be performed on the sample. Such an approach is not practical for in-line continuous monitoring. However, the subject innovation enables a small amount of electrolyte or solvent to be added automatically to the confined volume just prior to voltammetric sensor operation, thereby enabling in-line continuous monitoring of oxidation.

An oxidation reaction is not addition of oxygen to compounds in a fluid, but rather a loss of electrons in a fluid compounds. Similarly, a reduction phase of a voltammetric cycle results in a gain of electrons for fluid compounds. Thus a substantially greater voltage signal can be provided for a substantially greater time during a reduction phase when compared to an oxidation phase (e.g., a brief, low voltage signal will be provided for the oxidation phase). The increase amount of time in the reduction phase reduces oxidation present in fluid compounds. Moreover, the electrodes 1818, 1820, and 1822 can be constructed to enable greater amounts of voltage(s) than typical electrodes, and can further be constructed to provide a large surface area to facilitate reduction of a larger sample of fluid. While a single chemical sensor 1808 is illustrated, it is to be understood that the subject innovation contemplates a utilization of an array of electrodes 1818, 1820, and 1822 that can be alternatively selected to lengthen useful life of the chemical sensor 1808. Thus the chemical sensor 1808 can be employed to impede further degradation of a fluid within machinery, thus lessening probability of human error that can occur in maintaining machinery, as well as reducing cost of replacing fluid. Furthermore, the sensing capabilities of the chemical sensor 1808 together with the fluid maintenance capabilities of the chemical sensor 1808 can be utilized to create a closed-loop control system (e.g., oxidation levels are continuously sensed, and a control system utilizes the sensed oxidation levels to determine voltages to apply to electrodes 1818, 1820, and 1822).

In accordance with another aspect of the subject innovation, micro-electronic magnetic structures can be fabricated together with the electrodes 1818, 1820, and 1822. Providing energy to the micro-electronic magnetic structures results in attraction of ferrous metallic particles from the fluid to the magnetic structures. Presence of the magnetic field generated by the magnetic structures prevents such ferrous metallic particles from flowing freely in a fluid and thereby mitigates occurrences of such particles from contacting sensitive surfaces in machinery (e.g., a bearing raceway). For example, the ferrous particles can be bound to a sensor electrode with a plating-type operation. An amount of ferrous materials attracted can be measured with any suitable techniques that include conductivity between several sensor electrodes, plating energy, or capacitive or di-electric strength between surfaces. The electrochemical sensor may be operated by sweeping a range of symmetric voltages in over time in a triangular, sinusoidal, or other waveform and continually measuring the current response as described above. Perturbations in the resultant voltage-current curve provide an indication of the constituent materials and ions in the fluid. Rather than sweep a range of voltages, the electrochemical sensor may be operated by providing a specific voltage level of alternating polarity that corresponds to the specific component, compound, or contaminant of interest. This provides for a selective interrogation of the fluid and a more timely response from the sensing and analysis.

The conductivity sensor 1810 is of a two-electrode design, however, it is to be appreciated that other configurations (e.g., four electrode) may be employed. In the preferred embodiment, the two electrodes (1824, 1826) comprise gold, however, any suitable metal or material may be employed. Two and four electrode conductivity sensors are well known and thus further discussion related thereto is omitted for sake of brevity. Knowledge of the conductivity and dielectric strength such as obtained from these sensor elements is also useful for determining if metal wear and/or water and or other foreign fluids (e.g., fuel) is contaminating a fluid, for example.

The temperature sensor 1812 provides for determining the temperature of the fluid being analyzed, and is preferably formed from platinum, however, it is to be appreciated that any material (e.g., copper or nickel) suitable for carrying out the subject innovation may be employed. The temperature sensor 1812 is patterned on the base 1802 in accordance with a predetermined length, width, thickness and surface area. Therefore, by knowing the geometry of the temperature detector 1812 and the material of which it is made, a temperature of a fluid to which the temperature sensor 1812 is exposed may be determined based on the temperature-dependent electrical resistivity of the temperature detector 1812. Knowledge of fluid temperature is useful in interpreting the health state of the fluid being analyzed because certain fluid parameters (e.g. viscosity) are typically a function of fluid temperature. Furthermore, the rate of fluid breakdown, oxidation rate, or additive depletion is also a function of temperature. Therefore, predicting the remaining useful life of a fluid also requires temperature measurement.

In accordance with one aspect of the subject innovation, the temperature sensor 1812 can be a resistance temperature sensor, thereby enabling the temperature sensor 1812 to operate as a heater. As a current flows between the electrodes 1842 and 1844, the electrical resistance will cause the metallic interconnect and/or wire to heat up along with anything proximate to the metallic interconnect. The sensor element 1812 can effectively heat up and then sense a temperature of a small confined fluid sample. Such a process enables testing of a fluid at various known, controlled temperatures. This useful technique is not practical for large scale fluid heating and sampling due to potential damage to machinery and fluid that can result from excessive temperature, potential safety and process problems by operating equipment at elevated temperatures, and an amount of energy required to heat large volumes of fluid in a thermally conductive system. Therefore, it may be desirable to fabricate multiple temperature sensor elements 1812 on a single device or substrate. A plurality of temperature sensor element 1812 can be readily used for closed-loop feedback control of heat emitted by such temperature sensor elements to maintain precise control of temperature of the confined fluid. Acquiring data from other sensor elements at a controlled fluid temperature can significantly improve consistency of sensed parameters and enhance analysis capabilities regarding such parameters. It is to be noted that a casing that encloses the sensor 1800 can be constructed of thermally non-conductive materials to aid in controlling temperature of a confined fluid. In addition to utilizing one or more temperature sensor elements also as heating element, additional resistance-type heating elements may be fabricated along with temperature sensing elements. Several example designs are shown in FIG. 6 at 604 and 608. A desired temperature of the fluid may be obtained by providing a known energy level to the heating elements. Another technique for achieving a controlled fluid temperature is to utilize the temperature sensor element as a feedback signal for closed-loop control of the heating element or elements. Techniques for closed loop control of non-linear and time-delayed systems are well-known and may be applied for precise temperature control. Yet another technique for achieving a target fluid temperature under controlled conditions for sampling and analysis is to utilize a module in the modular sensor system as a holding chamber for a small quantity of sampled fluid. While the fluid is being held, a heating element with an optional temperature sensor and temperature controller could be employed to achieve the desired fluid temperature. Still another technique for controlling the fluid temperature is to heat the fluid as it is being transported in the modular sensor array. For example, a fluid transport channel (e.g., flow tube) may be encircled or aligned with a heating element. The rate of fluid movement, the energy to the heating element, and thermal conductivity of the structure will determine the amount of heat imparted to the fluid. A temperature sensing element in the test chamber or at the heating element can be used to control the parameters affecting fluid temperature (e.g., flow rate, energy to the heater) and thereby control the fluid temperature. Furthermore, using multiple temperature sensors and knowing the energy imparted to the heating element(s) it is possible to calculate the thermal conductivity of the fluid. Thermal conductivity may be a useful fluid parameter indicating fluid contamination, fluid degradation, or fluid breakdown. Dynamically increasing the energy to the heater to achieve a desired temperature in an allowed time period can also be used to compute thermal conductivity. That is, the process of heating with closed loop control can not only support unique and specific requirements for sensing at target temperatures but can also provide additional information on the fluid condition (e.g., thermal conductivity, thermal diffusivity).

Each fluid parameter sensor (e.g. pH or TAN sensor 1806, electrochemical sensor 1808, conductivity sensor 1810, temperature sensor 1812) has respective sets of contact pads 1828-1844 that provide for easy electrical coupling to the respective sensors. The fluid sensor 1800 is small having a square area of approximately 4 mm. Accordingly, the fluid sensor 1800 is desirable for use in applications where space is at a premium but where accuracy, reliability, and sensitivity of measured data are also at a premium. Furthermore, because the fluid sensor 1800 is fabricated in accordance with integrated circuit-like fabrication techniques, large batches of the fluid sensors 1800 may be easily and efficiently produced with good production yields, using conventional wafer fabrication facilities.

Furthermore, it is to be understood that some sensing devices 1804 may be omitted from the fluid sensor 1800 and/or different types of sensing devices (e.g., pressure sensor, IR sensor, NIR sensor, RAMAN, visible light sensor, field strength sensor, lubricity sensor, viscosity density sensor, biological sensor, bio-species sensor, light transmission sensor, shear sensor) may be incorporated into the fluid sensor 1800. One, some or all of the sensing devices 1804 may be replicated "n" number of times (wherein "n" is an integer) on a single fluid sensor 1800. Such an embodiment may provide for increased reliability because if one particular sensing device failed there would be like sensing devices serving as backups. Multiple sensing devices of the same type on a single fluid sensor 1800 may also afford for increased accuracy as a result of improved signal to noise ratio. The multiple versions of the same sensing element type may span a wide range of sizes, ratios, etc., each of which has a range of optimal sensing accuracy. Together these sensor elements 1804 provide for substantial accuracy over a wide range of parameter values. The replicated sensing devices 1804 may also improve dynamic range of the fluid sensor 1800 as well as versatility (e.g., the fluid sensor 1800 may be employed on a wide range of materials and/or fluids). Such an embodiment may also have enhanced integrity because it may be able to sense if a particular sensing device 1804 has failed or to identify the type of contaminant (e.g., engine coolant, transmission fluid, gear oil, . . . ). Of the multiple sensing elements of the same type, some may have different coatings that may them resistance to degradation from fluid characteristics (e.g., caustic fluids), make them resist certain materials (e.g., hydrophobic coatings), preferential to certain materials (e.g., hydrophilic), selective to certain ions (e.g., ion-selective electrode, ISE coatings), uniquely sensitive to certain compounds (e.g., molecular imprinted polymers—MIP), or uniquely sensitive to classes or species of biological agents (e.g., enzyme coatings or bio-imprinted coatings). Other coatings may be applied to provide for unique sensing, accuracy, reliability, survivability, adaptability, or dynamic response or wide range sensitivities.

Figure 19:
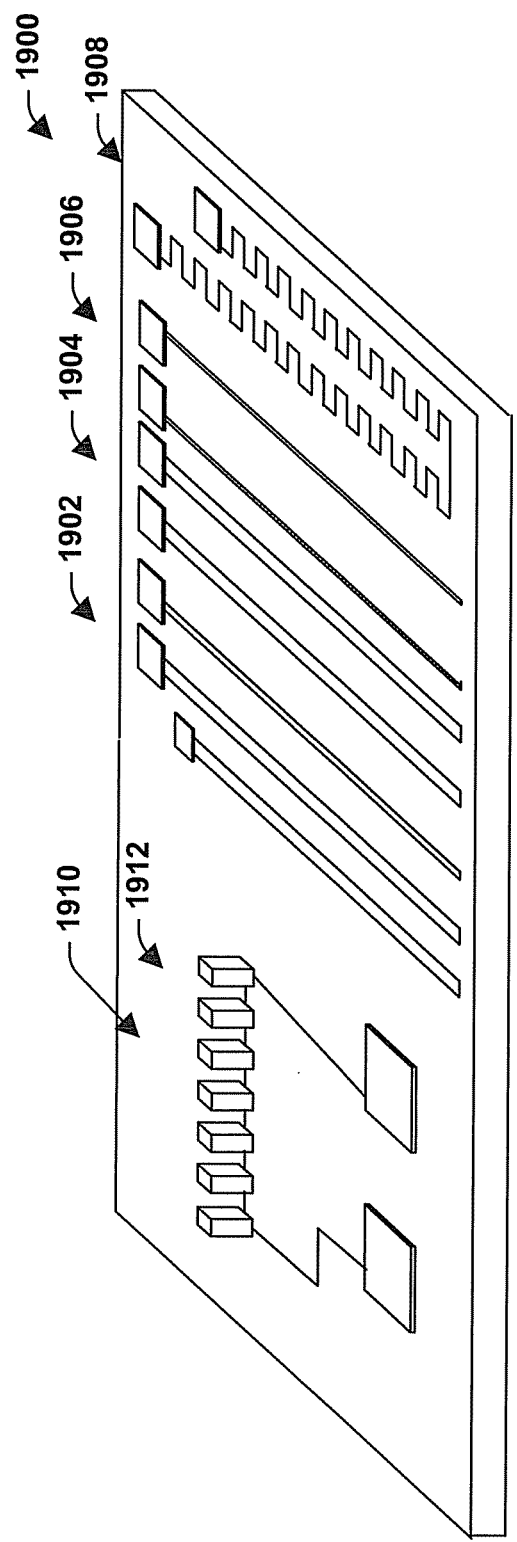
FIG. 19 is an exemplary multi-element sensor that can be utilized in connection with the present invention.

FIG. 19 illustrates another exemplary multi-element sensor 1900 that can be utilized in connection with the subject innovation. The multi-element sensor 1900 includes a pH or TAN sensor 1902, an electrochemical sensor 1904, a conductivity sensor 1906, a temperature sensor 1908, and a viscosity sensor 1910. The pH or TAN sensor 1902, the electrochemical sensor 1904, the conductivity sensor 1906, and the temperature sensor 1908 are essentially the same as that described in connection with FIG. 18 and therefore further discussion related thereto is omitted for sake of brevity. The viscosity sensor 1910 provides for sensing the viscosity of a fluid being analyzed. In short, the viscosity sensor 1910 works in conjunction with the temperature sensor 1908 to facilitate analyzing viscosity of the fluid being analyzed.

The viscosity sensor 1910 includes a plurality (e.g., array) of finger-like elements (e.g., cilia) 1912 which are plated with an electrically conductive material. The finger-like elements 1912 extend perpendicularly from a surface of the sensor, and the sensor 1910 functions based on a phenomena that a dissipative or damping force that resists the motion of the energized finger-like elements 1912 results in an increased power demand to maintain oscillation of the finger-like elements 1912 at a particular frequency. A fluid of high viscosity will exert a greater damping force on the oscillating finger-like elements 1912 than a fluid of lower viscosity. As a result, more power is required to maintain oscillation of the finger-like elements 1912 at a particular frequency in a high viscosity fluid than a fluid of lower viscosity. Thus, the viscosity of a fluid may be determined via the micro viscosity sensor 1910 of the subject innovation by monitoring the power required to oscillate the finger-like elements 1912 at a particular frequency and/or range of frequencies. Since the viscosity of a fluid is also a function of fluid temperature (e.g., typically, the higher the fluid temperature the lower the fluid viscosity), the subject innovation also employs the temperature detector 1908 to correlate the temperature of the lubricant or fluid with the aforementioned power requirements to accurately interpret lubricant or fluid viscosity. Varying temperature enables determination of accuracy of viscosity measurements, as well as presence of contaminants, sensor failure, etc. As described infra, the temperature of a fluid can be varied, which facilitate generation of a complete viscosity curve that can be employed in connection with fluid analysis. The generated viscosity temperature dependency curve may be compared with the nominal or standard curve for the fluid being sampled. Deviations between the generated curve and the nominal curve may be used to further identify the fluid being sampled, identify the degree of degradation of the fluid, identify possible contaminants, project the remaining life of the fluid and project the reminaing life of the machinery or process affected by the fluid. Furthermore, in some fluids (non-Newtonian fluids) viscosity varies with shear rate. Thus a MEMs viscometer can be operated at disparate frequencies to further analyze non-Newtonian and other similar fluids. Similarly, the rate-dependent viscosity observed can be compared to the nominal rate-dependent viscosity profile to characterize the fluid (e.g., Newtonian, thixotropic, rheopectric, dilantant) identify fluid breakdown, characterize contaminants, and estimate the remaining life of the fluid and the affective process or machinery. Moreover, entrapping a small sample of fluid in a casing, and thereafter moving the casing (e.g., vibrating the container) enables determination of fluid density (an extremely important fluid parameter for fluid analysis) based upon energy required for movement. Determination of density facilitates determining a kinetic viscosity from the absolute viscosity measured with the sensor 1910. A more detailed discussion relating to the operation and fabrication of such a viscosity sensor is found in U.S. Pat. No. 6,023,961, entitled MICRO-VISCOSITY SENSOR AND LUBRICATION ANALYSIS SYSTEM EMPLOYING THE SAME, which as mentioned above is hereby incorporated by reference in its entirety. The finger-line array of elements comprising the viscosity sensor element 1912 may be actuated over a range of frequencies and the resultant movement recorded to estimate viscosity. Alternatively, the sensor elements may be actuated at their resonant frequency and the resulting displacement (e.g., movement frequency, phase shift, amplitude) sampled to estimate viscosity and shear viscosity. Alternatively, the structure may be displaced and the restoring movement recorded to determine the fluid viscosity. As an alternative design, the geometry of the multiple finger-like elements may be oriented parallel to the plane of the substrate rather than perpendicular as shown in FIG. 19. When oriented parallel to the plane of the substrate, a series of inter-digitated fingers may be fabricated with one set of fingers being movable and the other set being fixed. The moveable fingers may be indexed or moved using established electro-static or Lorentz force movement. The rate of motion of the moveable set of fingers will be directly proportional to the viscosity of the fluid. An array of finger-like structures closely spaced may be actuated in unison and the resulting time-dependent displacement measured to provide an estimate of the fluid density. This information may be combined with the frequency response of the sparse finger-like array or parallel inter-digitated array results to provide a measure of the kinematic viscosity. The kinematic viscosity, as opposed to the absolute viscosity, is a more useful diagnostic tool for fluid health analysis.

Figure 20:
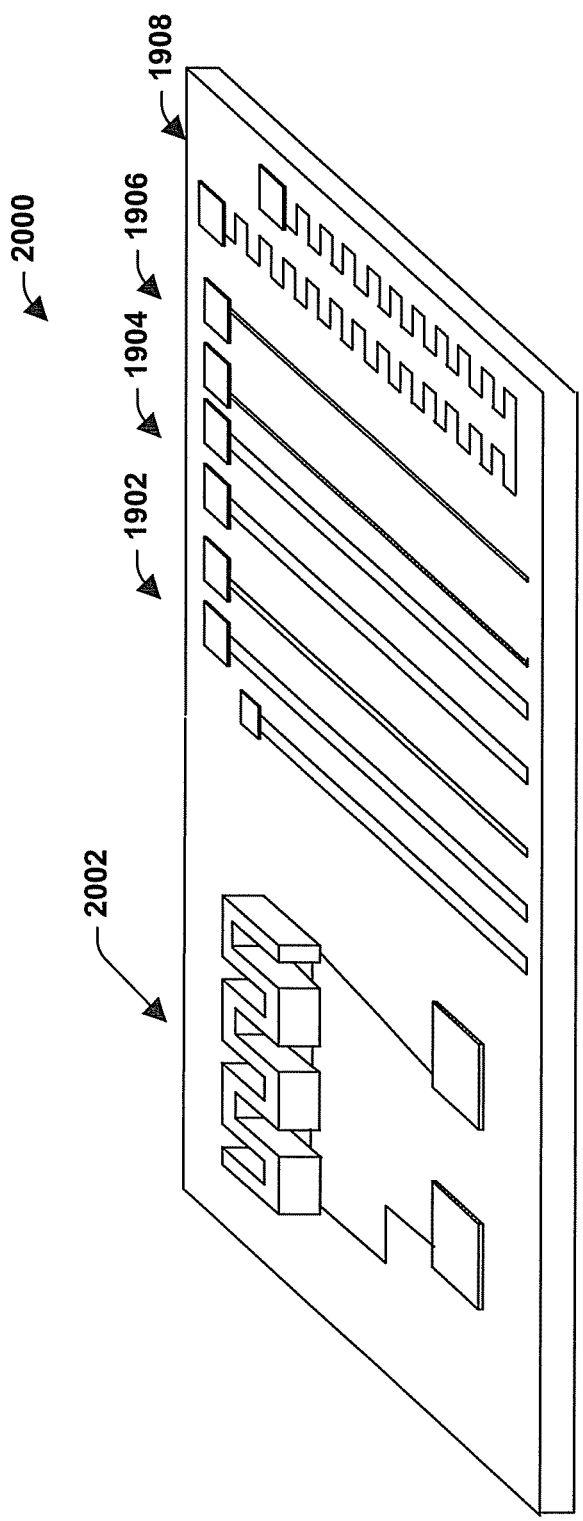
FIG. 20 is an exemplary multi-element sensor that can be utilized in connection with the present invention.

Referring now to FIG. 20, an exemplary multi-element sensor 2000 that can be employed in connection with the subject innovation is illustrated. FIG. 20 includes several components that are substantially similar to components illustrated in FIG. 19 and described above, therefore discussion pertaining to such components is omitted for sake of brevity. Like reference numerals are utilized to refer to like elements. The multi-element sensor includes a viscosity sensor 2002 that utilizes a comb-like structure to determine viscosity, which operates in a similar manner as the viscosity sensor described above. The multi-element sensor 2000 is displayed to illustrate that a plurality of disparate viscosity sensors are contemplated and intended to fall within the scope of the hereto-appended claims.

Figure 21:
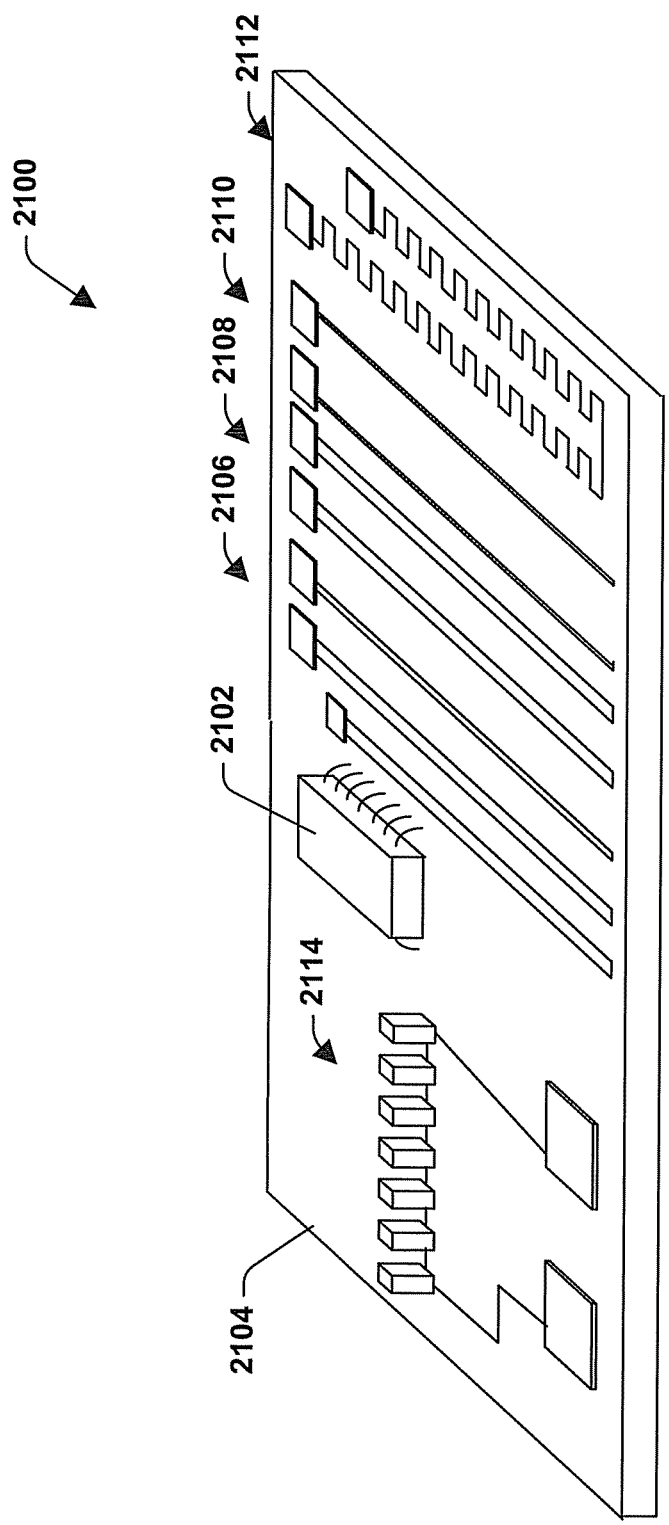
FIG. 21 is an exemplary multi-element sensor that can be utilized in connection with the present invention.

FIG. 21 illustrates another exemplary multi-element sensor 2100 that can be employed in connection with the subject innovation. The multi-element sensor 2100 also includes an integrated circuit 2102 integrated on a semiconductor surface 2104. While the processor is illustrated as a single device, it is understood that multiple devices that function together as a processor are contemplated and are intended to fall within the scope of the hereto-appended claims. For example, the integrated circuit 2102 may consist of analog components only. The analog integrated circuit can perform functions such as filtering, scaling, providing offset or bias signals, signal comparison signal generating, amplifying, and inverting functions. Alternatively, the integrated circuit may include a processor and can include an analog section and a digital/computational section. The analog section can comprise a plurality of analog filters, comparators, amplifiers, and/or signal generators as well as other analog functions for each sensor element. A/D and D/A logic function in the processor 2102 can be within a standard processor chip or implemented as a customized logic element, wherein such functions can be customized for performance, size, reliability, cost, weight, environment and power requirements of a particular sensor. The digital and analog elements can be integrated into a single chip, or alternatively distributed over multiple devices. For instance, the processor 2102 includes devices such as FPGA devices, ASIC devices, or fully custom integrated circuits. The processor 2102 can receive measurements obtained by a plurality of sensing elements, such as a pH or TAN sensor 2106, an electrochemical sensor 2108, a conductivity sensor 2110, a temperature sensor 2112, and a viscosity sensor 2114. The processor 2102 is employed to carry out general operations of the multi-element sensor 2100 including data fusion in accordance with an exemplary data fusion framework described in U.S. Pat. No. 6,286,363. The processor 2102 can be any of a plurality of suitable processors, such as for example: CPU die or processor/logic/storage bonded (flip chip) to the sensor substrate—the sensor elements may be wire bonded to processor I/O connection points. The manner in which the processor 2102 can be programmed to carry out the functions relating to the subject innovation will be readily apparent to those having ordinary skill in the art based on the description provided herein and thus further discussion related thereto is omitted for sake of brevity. Thus, the multi-element sensor 2100 provides for a substantially autonomous fluid measurement, analysis, and automatic maintenance system. The multi-element sensor 2100 can provide for performing fluid analyzer functions as well as affording for self-diagnosis. The multi-element sensor 2100 may also be able to verify that it is in a feasible operating regime. Sensor elements described in FIGS. 18-21 are an example of some configurations that can provide at least one fluid parameter and optionally embedded fluid logic. One or more of these sensor elements or sensor arrays may be integral to a module in the modular sensor system. The elements may be readily configured or re-configurable dynamically as conditions warrant. For example, due to changing application requirements or a sensor component failure, sensor elements designed to function in one manner such as to measure pH may be operated and sampled to estimate fluid conductivity. Dynamic re-configuration permits sensor operation to continue but perhaps with reduced response time, reduced accuracy, and/or with less efficiency.

Figure 22:
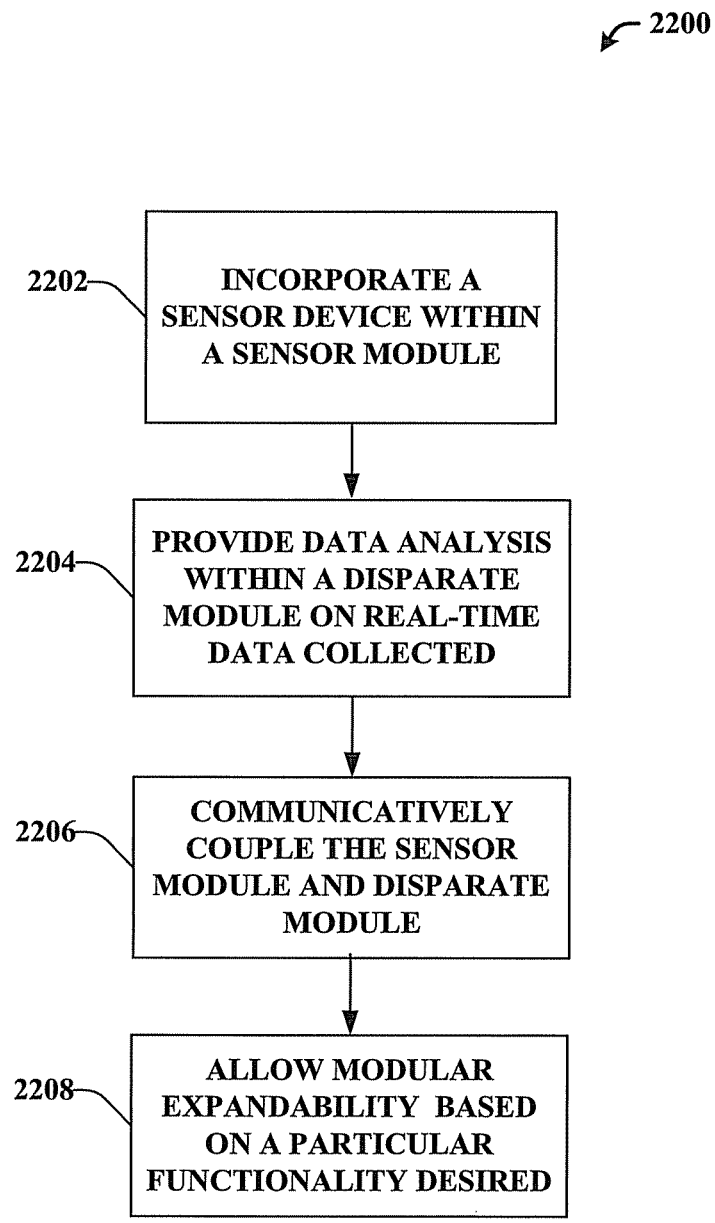
FIG. 22 illustrates an exemplary methodology for employing a modular-based sensor to provide real-time in situ measurements.
Figure 23:
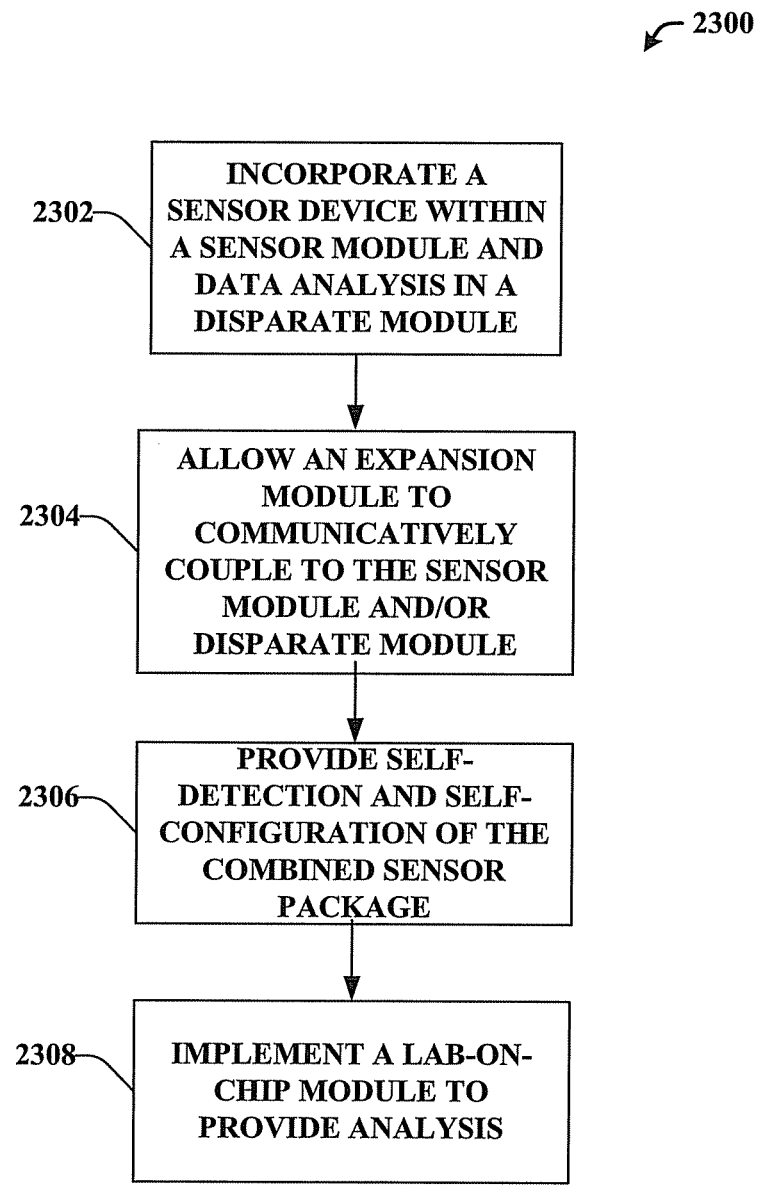
FIG. 23 illustrates an exemplary methodology that facilitates utilizing an expandable modular-based sensor that can be specifically tailored for a particular environment to provide real-time data.
Figure 24:
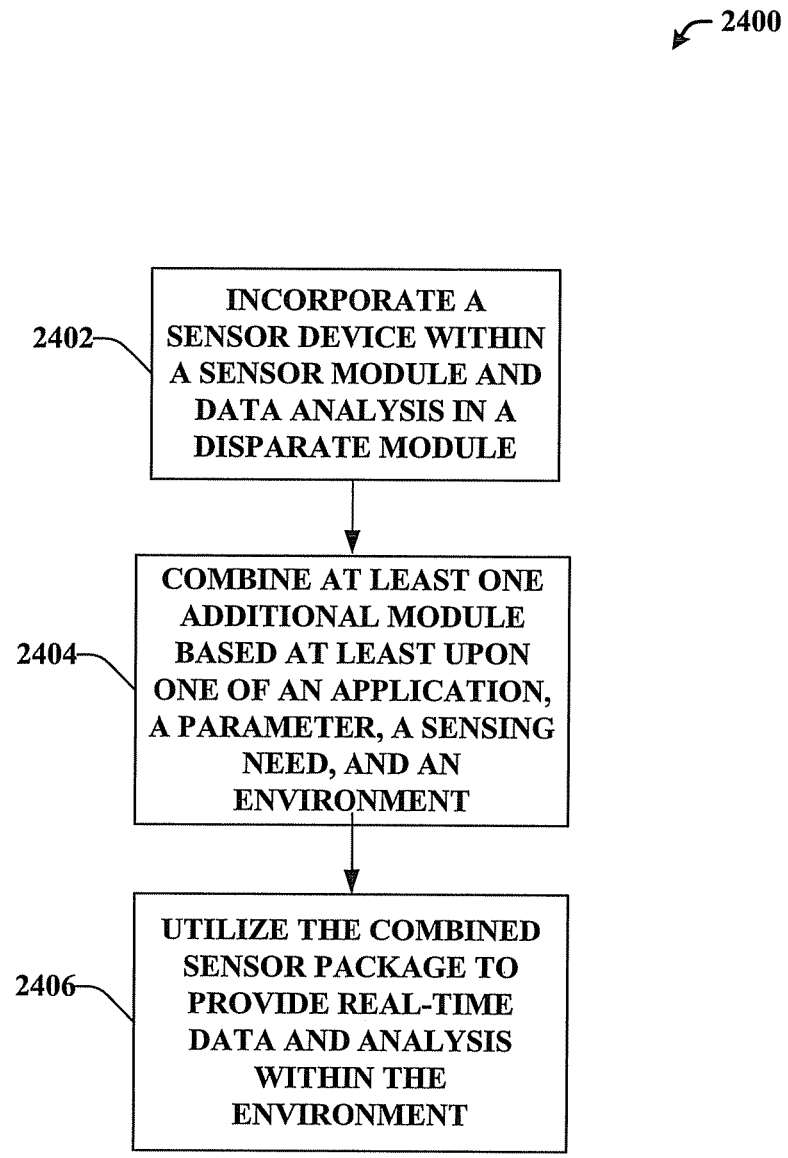
FIG. 24 illustrates an exemplary methodology that facilitates providing an intelligent sensor system that can be configurable to a plurality of environments to provide real-time measurements for at least one parameter.

Referring to FIGS. 22-24, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 22 illustrates a methodology 2200 for employing a modular-based sensor to provide real-time in situ measurements. At reference numeral 2202, a sensor device can be incorporated into a sensor module. The sensor device can provide real-time in situ measurements related to at least one parameter within a particular environment. For instance, a multi-element sensor device can be included with the sensor module that can sense at least one of the following: pH, dielectric, pressure, temperature, electro-chemical sensor elements, starch, moisture, density, bio-agents, oxidation, viscosity, acidity, polar materials, water (dissolved), capacitance, additive depletion, metal ions, sugar, salt, enzymes, gases, starch, oxidation in oils, viscosity of fluids, density of materials, contaminants, additives, and/or the acidity of effluents, metal ions, dissolved water, corrosion, additives, oxidation level, acidity, wavelength response (e.g., IR and NIR response), a solid form material (e.g., a powder, an airborne component), and degradation compounds.

It is to be appreciated that the sensor device incorporated into the sensor module can provide real-time measurements for a plurality of parameters within any suitable environment. Thus, the sensor device can provide a real-time in situ measurement related to one or more particular parameters, wherein the parameter can be associated with a process and/or relate to the process, equipment, and/or product. The term product includes the output from the process whether consumable or not. Product may include human consumable goods such as foods or pharmaceuticals, usable by-products (e.g., odorants), animal feed, recyclable wastes, digestible waste, gaseous release, and unusable output (e.g., material for disposal or burning). For example, the real-time data collection can be related to a food process environment. The food process environment can be any suitable food process, factory, application, plant, etc. that produces, alters, or packages a food product. Moreover, the food process environment can be any industrial automation environment that produces a food product and/or a portion of a food product. For example, the food process environment can include and/or be associated with, but is not limited to, an incoming raw material (e.g., carrots, beans, potatoes, corn, lettuce, peanuts, salt, grapes, oranges, nuts, sugar, milk, flavorings, food extracts etc.), cooking oil, wash water, cooking water, a storage tank, bio-process such as a microbial digestion system, a fermenting process such as beer making, beverage making including formulation, blending, and gas control, cooking, a food package, a food packaging line, a food ingredient dispenser, food distribution, food storage, food transport, a waste stream, etc. Furthermore, the sensor device can provide real-time process or in situ measurement of food mixing parameters and food blending parameters related to the food process environment.

At reference numeral 2204, data analysis within a disparate module can be provided for the real-time data collected, measured, and/or stored. The disparate module can read and/or analyze data collected by the sensor device within the sensor module. In particular, the disparate module can include components that allow extensibility and configurability (e.g., hardware and/or software) to permit readily specifying, constructing, programming, and deploying a reconfigurable intelligent sensor system. It is to be appreciated that the disparate module can provide a plurality of analysis based at least in part upon the received real-time data related to a parameter associated with the environment. In one example, module can effectuate the environment based at least in part upon the real-time data collected by the sensor device. In other words, disparate module can provide at least one of the following: data manipulation, updates, feedback, open-loop control, closed-loop control, state assessment (e.g., failure imminent), trending, forecasting, economic analysis, and/or any other suitable data configuration based on the sensor device and real-time detections. For example, the disparate module can manipulate any process and/or application associated with the environment, wherein the manipulation can be based at least in part upon the real-time in situ measurement of data collected by the sensor device incorporated within the sensor module.

At reference numeral 2206, the sensor module and the disparate module can be communicatively coupled. Based on the modular design, the sensor module and the disparate module can be specifically tailored to monitor and/or sense any suitable parameter within any suitable environment. In other words, the sensor module can house a specific sensor device for the particular environment and/or parameters that are to be measured, while the disparate module can analyze the collected data from the specific sensor device. In one example, PC communications software can be part of the system for design, configuration, setup, downloading, calibration, re-configuration, troubleshooting, analysis, etc. By allowing the sensor module and the disparate module to be modular and fitted for any environment and/or application, the effectiveness for real-time in situ sensing and/or monitoring is greatly increased. Thus, multiple sensor designs need not be developed, manufactured, stocked, and/or supported to accommodate the widely varying application requirements and sensing needs.

At reference numeral 2208, the modular configuration/architecture of the sensor module and the disparate module can be expanded based on a particular functionality desired. For instance, each sensing need for a particular environment, parameter, and/or application can require numerous settings, configurations, and/or components to provide accurate and efficient real-time in situ measurements. Thus, the sensor module and the disparate module can be expanded to include additional modules and/or components to allow personalization to an application, a parameter to be measured, and/or a particular environment.

FIG. 23 illustrates a methodology 2300 that facilitates utilizing an expandable modular-based sensor that can be specifically tailored for a particular environment to provide real-time data. At reference numeral 2302, a sensor device can be incorporated into a sensor module and data analysis can be incorporated into a disparate module. The sensor device can provide real-time in situ measurements related to at least one parameter within a particular environment such as, for example, a multi-element sensor device. The disparate module can read and/or analyze data collected by the sensor device within the sensor module. In particular, the disparate module can include components that allow extensibility and configurability (e.g., hardware and/or software) to permit readily specifying, constructing, programming, and deploying a reconfigurable intelligent sensor system.

At reference numeral 2304, an expansion module can be utilized to communicatively couple to the sensor module and/or the disparate module to provide additional functionality to the intelligent sensor package. By utilizing a modular architecture for the sensor device and data analysis, these core modules can be expanded upon to provide customization for any environment, application, and/or parameter to be measured. Moreover, any suitable sensing need can be met by adding an appropriate module that meets the desired functionality and/or operation. For instance, a parameter within a liquid can be measured and analyzed by the core modules. Thus, an engineer may want to enhance functionality by implementing one of, but not limited to, the following: adding a communication module to transmit the real-time data; a display module to display data; a power module to provide adequate power supply; a processor module to employ processing capabilities; a memory module to provide adequate memory storage; a power generating module using vibration; a power generating module employing a micro-fuel cell; a bio-sensing module; a fluid extraction and release module; an agent interface module; a heater module; a cooling module; and a reservoir control module.

At reference numeral 2306, a self-detection and self-configuration of the combined sensor package can be employed. It is to be appreciated that the combined sensor package can include the core modules plus any additional modules combined with the core modules to provide enhanced functionality and/or operability. The combined sensor package can provide a customized, configurable/reconfigurable, and versatile intelligent package sensor, wherein each module can implement a self-detection and/or self-configuration respectively. In other words, one or more of the modules associated with the combined sensor package can detect each other, and self-configure accordingly. Thus, individual configuration and/or setup need not be required based on the identification of the totality of the modules and detected and/or ascertained settings respective to each module.

At reference numeral 2308, a lab-on-chip module can provide analysis to the combined sensor package. For instance, specific laboratory procedures can be incorporated into a module(s), wherein each laboratory step and/or procedure can be provided utilizing the module(s) rather than utilizing a physical laboratory and/or testing. The lab-on-chip module can include any suitable number of laboratory steps and/or procedures, wherein each step and/or procedure can be housed within a respective lab-on-chip module or the totality of the lab-on-chip procedures and/or steps can be included within a single module. As depicted, the lab-on-chip can include any necessary number of procedures and/or steps such as lab-on-chip 1 to lab-on-chip N, where N is a positive integer. For instance, the lab-on-chip module can provide sample preparation, sample testing, analysis, additive tests, any suitable lab function, heating, cooling, filtering, incubating, diluting, chemical reacting, straining, etc. Furthermore, the lab-on-chip module steps and/or procedures can be implemented in parallel, serial, and/or any combination thereof.

FIG. 24 illustrates a methodology 2400 that facilitates providing an intelligent sensor system that can be configurable to a plurality of environments to provide real-time measurements for at least one parameter. At reference numeral 2402, a sensor device and data analysis can be incorporated into a module and/or two disparate modules respectively. It is to be appreciated the combination of the sensor device and data analysis into at least one module can be referred to as a core module that can be specifically tailored to suit an application, an environment, a sensing need, and/or a parameter to be measured in real-time. In one example, PC communications software can be part of the system for design, configuration, setup, downloading, calibration, re-configuration, troubleshooting, analysis, etc. At reference numeral 2404, the core module can be combined with at least one additional module based at least in part upon one of an application, a parameter, a sensing need, a processing need, a reliability need, an analysis need, a communications need, a display need, a control need, a fluid alteration need, an environment, a desired functionality, a module minimum requirement (e.g., power supply, processor, memory, etc.). Upon combination of the at least one additional module to the core module, the totality of modules can be referred to as a combined sensor package. At reference numeral 2406, the combined sensor package can provide real-time data and analysis with the environment and/or parameter for which the package was customized. Moreover, it is to be appreciated that the combined sensor package can be re-configured and/or manipulated by adding and/or removing modules according to the sensing need to be filled. The addition or removal of a module may be performed manually or automatically. Software and logic within the sensor package can provide for identifying and integrating new modules and can detect and accommodate removed modules, failed modules, degraded modules, or modules with reduced capacity or reduced lifetime. The module interface that permits automatic module recognition and functional integration may be of an open standard interface. This will permit many sensor companies to provide functional modules that may be sold and readily incorporated into a combined sensor package. Software may be provided to identify new compliant modules, configure new modules, monitor module performance, initiate and carry out set-up and calibration, module removal, module repair, and module upgrading and re-programming.

Figure 25:
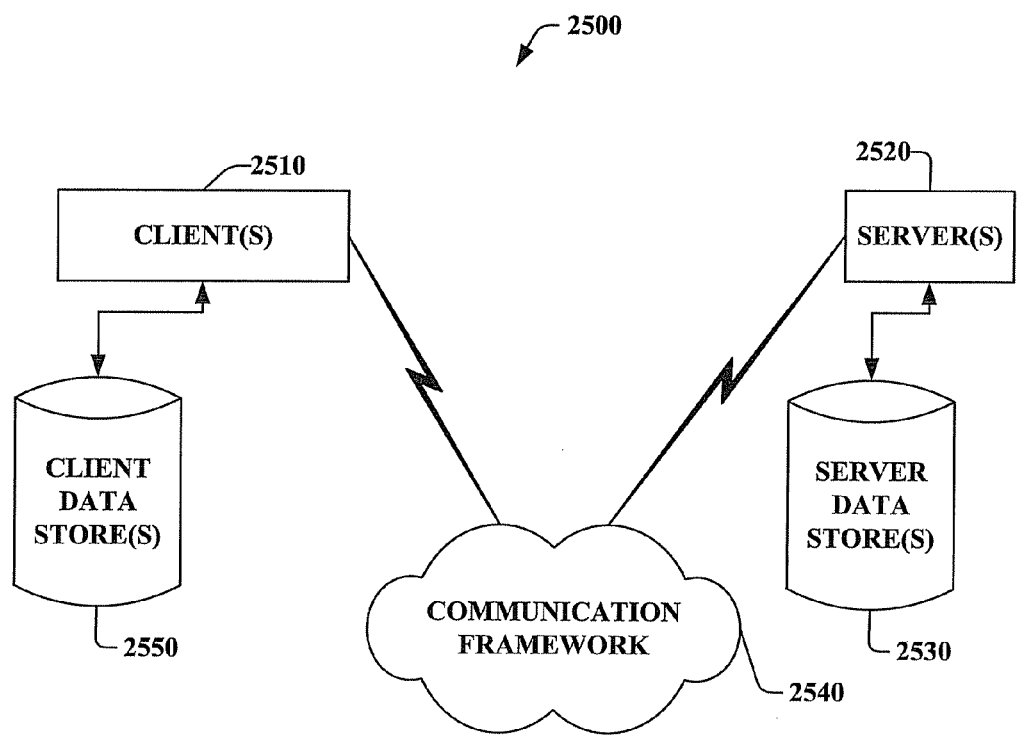
FIG. 25 is an exemplary computing environment that can be utilized in connection with the claimed subject matter.
Figure 26:
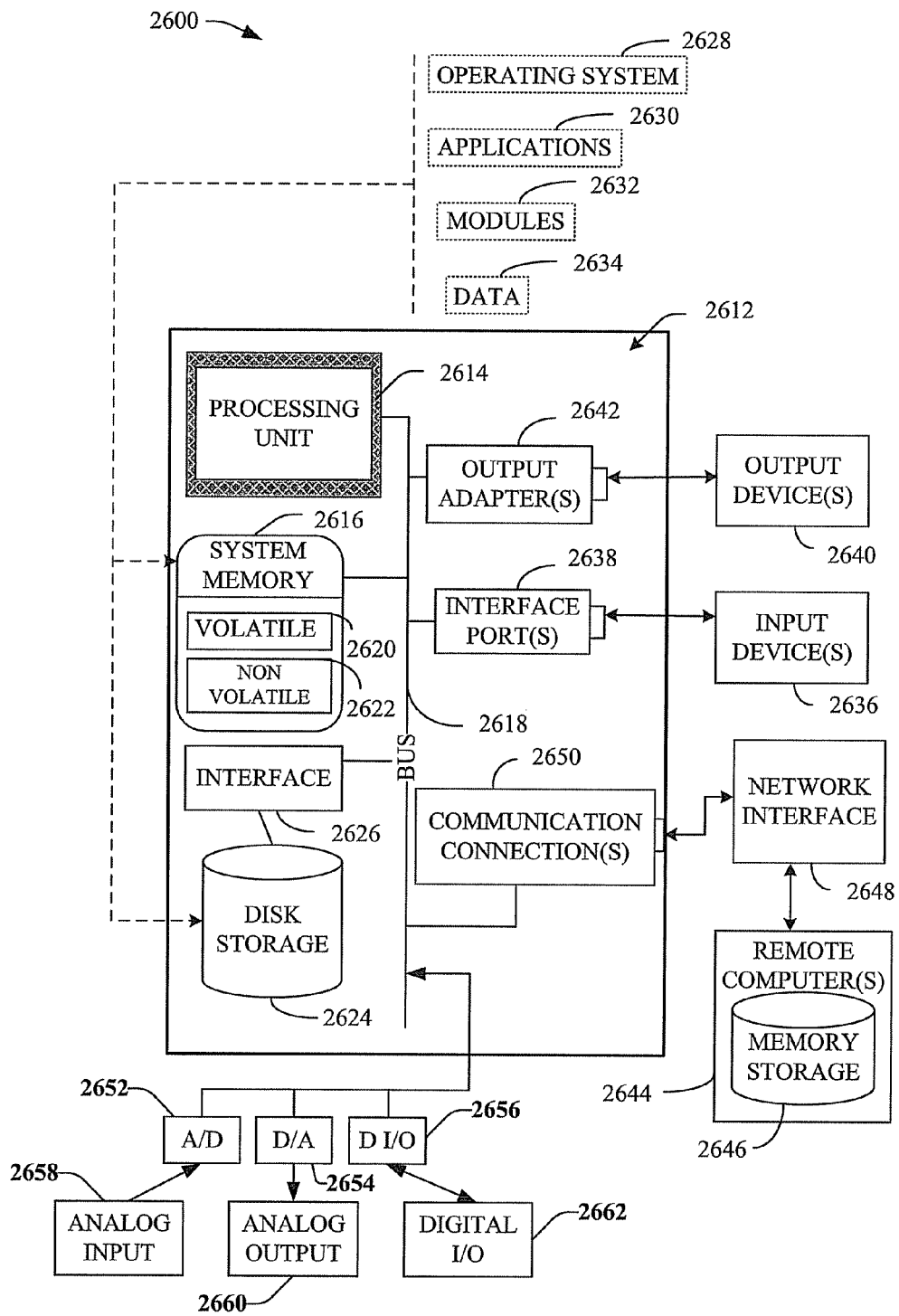
FIG. 26 is an exemplary networking environment that can be utilized in connection with the claimed subject matter.

In order to provide additional context for implementing various aspects of the claimed subject matter, FIGS. 25-26 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, wireless sensor nodes, and the like, each of which may operatively communicate with one or more associated devices. The illustrated aspects of the claimed subject matter may also be practiced in distributed computing environments where certain tasks are performed by remote processing devices that are linked through a communications network such as, but not limited to a hardwire, optical, wireline, and/or wireless communications network. However, some, if not all, aspects of the subject innovation may be practiced on stand-alone computers. In a distributed computing environment, program modules may be located in local and/or remote memory storage devices.

FIG. 25 is a schematic block diagram of a sample-computing environment 2500 with which the claimed subject matter can interact. The system 2500 includes one or more client(s) 2510. The client(s) 2510 can be hardware and/or software (e.g., threads, processes, computing devices). The system 2500 also includes one or more server(s) 2520. The server(s) 2520 can be hardware and/or software (e.g., threads, processes, computing devices). The servers 2520 can house threads to perform transformations by employing the subject innovation, for example.

One possible communication between a client 2510 and a server 2520 can be in the form of a data packet adapted to be transmitted between two or more computer processes. The system 2500 includes a communication framework 2540 that can be employed to facilitate communications between the client(s) 2510 and the server(s) 2520. The client(s) 2510 are operably connected to one or more client data store(s) 2550 that can be employed to store information local to the client(s) 2510. Similarly, the server(s) 2520 are operably connected to one or more server data store(s) 2530 that can be employed to store information local to the servers 2520. It is to be appreciated that the servers can be peer-to-peer or highly distributed collaborating systems.

With reference to FIG. 26, an exemplary environment 2600 for implementing various aspects of the claimed subject matter includes a computer 2612. The computer 2612 includes one or more processing units 2614, a system memory 2616, and a system bus 2618. The system bus 2618 couples system components including, but not limited to, the system memory 2616 to the processing unit 2614. The processing unit 2614 can be any of various available processors. Dual microprocessors and other multiprocessor architectures also can be employed as the processing unit 2614.

The system bus 2618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 2616 includes volatile memory 2620 and nonvolatile memory 2622. The basic input/output system (BIOS), containing the basic routines to transfer information between elements within the computer 2612, such as during start-up, is stored in nonvolatile memory 2622. By way of illustration, and not limitation, nonvolatile memory 2622 can include read only memory (ROM), programmable ROM (PROM), electrically programmable ROM (EPROM), electrically erasable programmable ROM (EEPROM), or flash memory. Volatile memory 2620 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2612 also includes one or more removable/non-removable, volatile/non-volatile computer storage media. FIG. 26 illustrates, for example a disk storage 2624. Disk storage 2624 includes, but is not limited to, devices like a magnetic disk drive, floppy disk drive, tape drive, Jaz drive, Zip drive, LS-100 drive, flash memory card, or memory stick. In addition, disk storage 2624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2624 to the system bus 2618, a removable or non-removable interface is typically used such as interface 2626. It is to be appreciated that the claimed subject matter can further be implemented in a self-contained package as depicted in earlier figures, wherein the sensor can be illustrated as an integrated smart sensor (e.g., self-powered, self-contained, wireless device to communicate real-time data associated to an environment).

It is to be appreciated that FIG. 26 describes software that acts as an intermediary between users and the basic computer resources described in the suitable operating environment 2600. Such software includes an operating system 2628. Operating system 2628, which can be stored on disk storage 2624, acts to control and allocate resources of the computer system 2612. System applications 2630 take advantage of the management of resources by operating system 2628 through program modules 2632 and program data 2634 stored either in system memory 2616 or on disk storage 2624. It is to be appreciated that the claimed subject matter can be implemented with various operating systems or combinations of operating systems or with no operating system.

A user enters commands or information into the computer 2612 through input device(s) 2636. Input devices 2636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2614 through the system bus 2618 via interface port(s) 2638. Interface port(s) 2638 include, for example, a serial port, a parallel port, a game port, and a universal serial bus (USB). Output device(s) 2640 use some of the same or similar type of ports as input device(s) 2636. Thus, for example, a USB port may be used to provide input to computer 2612, and to output information from computer 2612 to an output device(s) 2640. Output adapter 2642 is provided to illustrate that there are some output devices 2640 like monitors, speakers, and printers, tower lights, LCD arrays, annunciators, among other output devices 2640, which require special adapters. The output adapters 2642 include, by way of illustration and not limitation, video and sound cards that provide a means of connection between the output device 2640 and the system bus 2618. It should be noted that other devices and/or systems of devices provide both input and output capabilities such as remote computer(s) 2644. It is to be appreciated that the claimed subject matter can also employ input or output interfaces for analog or digital signals (discussed below).

Computer 2612 can operate in a networked environment using logical connections to one or more remote computers, such as remote computer(s) 2644. The remote computer(s) 2644 can be a personal computer, a server, a router, a network PC, a workstation, a microprocessor based appliance, a portable digital assistant (PDA), a peer device or other common network node and the like, and typically includes many or all of the elements described relative to computer 2612. For purposes of brevity, only a memory storage device 2646 is illustrated with remote computer(s) 2644. Remote computer(s) 2644 is logically connected to computer 2612 through a network interface 2648 and then physically connected via communication connection 2650. Network interface 2648 encompasses wire and/or wireless communication networks such as local-area networks (LAN) and wide-area networks (WAN), point to point wireless networks and ad hoc wireless mesh networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, wireless networks (e.g., includes wireless Ethernet such as IEEE 802.11b, bluetooth, IEEE 802.15.4, Zigbee, etc.) and Digital Subscriber Lines (DSL).

Communication connection(s) 2650 refers to the hardware/software employed to connect the network interface 2648 to the bus 2618. While communication connection 2650 is shown for illustrative clarity inside computer 2612, it can also be external to computer 2612. The hardware/software necessary for connection to the network interface 2648 includes, for exemplary purposes only, internal and external technologies such as, modems including regular telephone grade modems, cable modems and DSL modems, RFID adapters, ISDN adapters, and Ethernet cards.

The system 2600 can further include at least one of the following: an analog to digital converter 2652 (referred to as "A/D") that can receive an analog input 2658; a digital to analog converter 2654 (referred to as "D/A") that can output an analog output 2660; and a digital input/output 2656 (also referred to as "D I/O") that can receive and/or transmit a digital input and/or output 2662. The analog input signal(s) 2658, analog output signal(s) 2660, and digital I/O signals 2662 may be connected to sensor elements as described above. Alternatively, sensor elements may have embedded logic and interface to the computer systems via the output device interface 2640, input device interface 2636, or network interface 2648.

The elements described in computer system 2600 may be embodied in a single module. Alternatively, components may be distributed in several or more modules. For example, one module may contain the processing unit and memory, while another module contains the analog and digital I/O signals along with a multi-element sensor device, while another module contain the output devices (e.g., LED health indicator), while yet another module contains the network interface (e.g., IEEE 802.11b wireless interface). Additionally, a system may have elements shown in 2600 omitted or functions incorporated into external modules or multiple functions embedded in a small number of modules. Lastly, a system may include multiple of the elements shown in 2600. For example, multiple processors may be used to process individual sensor element responses in parallel and the results combined with a third analysis and communications processor.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:
1. A system, comprising:
an expandable sensor device, comprising:
    a sensor operation module configured to analyze real-time in situ measurements;
    a first sensor module configured to provide a first real-time in situ measurement associated with a first parameter within an environment, wherein the first sensor module is configured to be removably coupled to the sensor operation module via a first interface;
at least one additional sensor module configured to be removably coupled to at least one of the sensor operation module or the first sensor module via at least one additional interface, wherein the at least one additional sensor module is further configured to provide at least one additional real-time in situ measurement associated with at least one additional parameter within the environment; and
wherein the at least one additional sensor module includes a reservoir control module that includes a reservoir and is configured to take a sample associated with the environment that is to be measured, the sample is an operating fluid employed by a machine or a process, and the reservoir control module contains an amount of a replacement fluid, a reagent, a catalyst, a filter, or an additive configured to be administered to the operating fluid to extend an operation life of the machine or the process.

2. The system of claim 1, wherein at least one of the first parameter or at least one additional parameter is associated with at least one of a process, a food process, a factory, an application, a plant, a food product production, a product production, an industrial automation environment that produces a product, a process plant, a packaging and bottling facility, a commercial kitchen, an institution, a full service restaurant, a fast service restaurant, or an automated equipment that at least one of produces, alters, or packages a food product.

3. The system of claim 1, wherein at least one of the first parameter or at least one additional parameter is associated with at least one of an incoming raw material, a cooking oil, a wash water, a cooking water, a storage tank, a bioprocess, a microbial digestion system, a fermenting process, a beverage making, a blending, a gas control, a cooking, a food package, a food packaging line, a food ingredient dispenser, a food distribution, a food storage, a food transport, a waste stream, an up-stream food chemical/additive manufacturing, a grower, a picker, a food manufacturer, a restaurant, a home, a waste recovery operation, a hauler, a cafeteria, a consumable food, a beverage, a bio-fluid, a packaging, an animal food, a by-product of a food process, a food waste, a pharmaceutical, a bio-process, a medical process, a water supply, a water treatment, a waste water treatment, a food ingredient, an additive, or a food waste scrap.

4. The system of claim 1, wherein the sensor operation module includes a sensor operation component configured to provide a data manipulation based on analysis of the real-time in situ measurements.

5. The system of claim 4, wherein the sensor operation component is further configured to adjust an operational parameter associated with the machine or process based at least in part upon analysis of the real-time in situ measurements.

6. The system of claim 4, wherein the sensor operation component is further configured to control at least one of the process, an application, the first sensor module, or the at least one additional sensor module based on analysis of the real-time in situ measurements.

7. The system of claim 1, wherein at least one of the first sensor module or the at least one additional sensor module includes a multi-element sensor.

8. The system of claim 7, wherein the multi-element sensor includes at least one sensing element that is fabricated with a suite of at least one of a micro-electronic sensor element or a micro electro-mechanical element.

9. The system of claim 8, wherein the sensing element is configured to continuously detect at least one of the following in real-time: a starch; a moisture; a density; a bio-agent; an oxidation; a temperature; a viscosity; an acidity; a dielectric; polar material; an amount of dissolved water; a capacitance; a pH; an additive depletion; a metal ion; a density; a sugar; a salt; an enzyme; a gas; a pressure; a toxin; a foreign material; entrapped air; a crystalline form, an ice crystal; an contaminant; a sugar amount; a sugar type; an additive presence; an additive concentration; a current; a vibration; an acoustic signal; a voltage; an electro-magnetic field; an optical characterstic; an odor; a solid form material; a powder; an airborne component; or an electro-chemical characteristic.

10. The system of claim 8, wherein the multi-element sensor includes at least one coating on the at least one sensor element that at least one of protects against harsh environments or materials, is less susceptible to contamination or fouling, provides selective sensing, provides component specific sensitivity, provides bio-selective sensing, or provides for controlled accelerated degradation.

11. The system of claim 1, wherein the at least one additional sensor module includes at least one of the following: a display module; a power module; a memory module; a communication module; a processor module; an additive/oil reservoir control module; an additive/oil fluid reservoir module; an electronics amplifier and digital processor module; an IR module; an NIR module; a Raman module; a tHz module; a turbidity module; an incubation module; an incubation module with a controlled environment for at least one of temperature, pressure, reagents, or nutrients; or a multi-element sensor module.

12. A system, comprising:
    means for sensing that is expandable, comprising:
        means for analyzing real-time in situ measurements;
        means for providing a first real-time in situ measurement associated with a first parameter within an environment, wherein the means for providing a first real-time in situ measurement is configured to be removably coupled to the means for analyzing via a first means for interfacing;
        at least one additional means for providing at least one additional real-time in situ measurement associated with at least one additional parameter within the environment, wherein the at least one additional means for providing at least one additional real-time in situ measurement is configured to be removably coupled to at least one of the means for providing a first real-time in situ measurement or the means for analyzing via at least one additional means for interfacing; and
        wherein the at least one additional means for providing at least one additional real-time in situ measurement includes a means for controlling a reservoir that includes the reservoir and is configured to take a sample associated with the environment that is to be measured, the sample is an operating fluid employed by a machine or a process, and the means for controlling the reservoir contains an amount of a replacement fluid, a reagent, a catalyst, a filter, or an additive configured to be administered to the operating fluid to extend an operation life of the machine or the process.

13. The system of claim 12, wherein the means for analyzing is further configured to adjust an operational parameter associated with the machine or process based at least in part upon analysis of the real-time in situ measurements.

14. The system of claim 12, wherein at least one of means for providing a first real-time in situ measurement or the means for providing at least one additional real-time in situ measurement includes a means for sensing a plurality of parameters.

15. The system of claim 14, wherein the means for sensing a plurality of parameters comprises at least one of a micro-electronic sensor element or a micro electro-mechanical element.

16. The system of claim 14, wherein the means for sensing a plurality of parameters is configured to continuously detect at least one of the following in real-time: a starch; a moisture; a density; a bio-agent; an oxidation; a temperature; a viscosity; an acidity; a dielectric; polar material; an amount of dissolved water; a capacitance; a pH; an additive depletion; a metal ion; a density; a sugar; a salt; an enzyme; a gas; a pressure; a toxin; a foreign material; entrapped air; a crystalline form, an ice crystal; an contaminant; a sugar amount; a sugar type; an additive presence; an additive concentration; a current; a vibration; an acoustic signal; a voltage; an electro-magnetic field; an optical characteristic; an odor; a solid form material; a powder; an airborne component; or an electrochemical characteristic.

17. The system of claim 14, wherein the means for sensing a plurality of parameters includes at least one coating that at least one of protects against harsh environments or materials, is less susceptible to contamination or fouling, provides selective sensing, provides component specific sensitivity, provides bio-selective sensing, or provides for controlled accelerated degradation.

18. The system of claim 12, wherein the means for analyzing is further configured to instruct the means for controlling the reservoir to administer the amount of the replacement fluid, the reagent, the catalyst, the filter bed, or the additive to the operating fluid based at least in part upon analysis of the real-time in situ measurements.

19. The system of claim 12, wherein the means for analyzing is further configured to determine the amount of the replacement fluid, the reagent, the catalyst, the filter bed, or the additive based at least in part upon analysis of the real-time in situ measurements.

20. The system of claim 12, wherein the means for controlling the reservoir is further configured to determine an amount of the sample to take.

21. The system of claim 12, wherein the means for controlling the reservoir is further configured to determine when to discharge the sample from the reservoir.

22. The system of claim 12, wherein the first means for interfacing and the at least one additional means for interfacing form a backplane.

23. The system of claim 22, wherein the backplane is a fluid backplane configured to allow at least one fluid to flow between at least two of the means for analyzing, the means for providing a first real-time in situ measurement, or the means for providing at least one additional real-time in situ measurement.

24. The system of claim 23, wherein the flow is bi-directional.

25. The system of claim 1, wherein the sensor operation module is further configured to instruct the reservoir control module to administer the amount of the replacement fluid, the reagent, the catalyst, the filter bed, or the additive to the operating fluid based at least in part upon analysis of the real-time in situ measurements.

26. The system of claim 1, wherein the sensor operation module is further configured to determine the amount of the replacement fluid, the reagent, the catalyst, the filter bed, or the additive based at least in part upon analysis of the real-time in situ measurements.

27. The system of claim 1, wherein the reservoir control module is further configured to determine an amount of the sample to take.

28. The system of claim 1, wherein the reservoir control module is further configured to determine when to discharge the sample from the reservoir.

29. The system of claim 1, wherein the first interface and the at least one additional interface form a backplane.

30. The system of claim 29, wherein the backplane is a fluid backplane configured to allow at least one fluid to flow between at least two of the sensor operation module, the first sensor module, or the at least one additional sensor module.

31. The system of claim 30, wherein the flow is bi-directional.

32. The system of claim 31, wherein the flow is in a single direction.

* * * * *